United States Patent [19]

Ueguri et al.

[11] 4,438,317
[45] Mar. 20, 1984

[54] PULSE ARC WELDING MACHINE

[75] Inventors: Shigeo Ueguri; Hirotsugu Komura, both of Hyogo; Takaji Mizuno, Aichi, all of Japan

[73] Assignee: Mitsubishi Denki Kabushiki Kaisha, Tokyo, Japan

[21] Appl. No.: 281,263

[22] Filed: Jul. 8, 1981

[30] Foreign Application Priority Data

Jul. 8, 1980 [JP] Japan ................... 55-93069
Jul. 8, 1980 [JP] Japan ................... 55-93077
Jul. 8, 1980 [JP] Japan ................... 55-93086

[51] Int. Cl.$^3$ .............................................. B23K 9/09
[52] U.S. Cl. ........................... 219/130.51; 219/130.31; 219/137.71
[58] Field of Search ............... 219/130.51, 130.21, 219/130.33, 130.32, 130.31, 137.71

[56] References Cited

U.S. PATENT DOCUMENTS 3,906,184  9/1975  Gibbs et al. ................ 219/130.21
3,912,980  10/1975 Crump et al. ................ 219/130.33
4,349,720  9/1982  Mäkima ....................... 219/130.33

FOREIGN PATENT DOCUMENTS 2840230  3/1979  Fed. Rep. of Germany ................... 219/137.71

Primary Examiner—C. C. Shaw
Attorney, Agent, or Firm—Sughrue, Mion, Zinn, Macpeak and Seas

[57] ABSTRACT

A pulse arc welding machine including a wire electrode, a wire feeding unit for feeding the wire electrode to a base material, a base current source for supplying a base current between the wire electrode and the base material, a pulse current source for supplying a pulse current superposed on the base current, a detector for detecting the arc discharge voltage between the wire electrode and the base material, and a controller. The controller compares a detected output value from the detector with a preset reference value to thereby control the amount of heat applied to the wire electrode wherein the arc voltage between the wire electrode and the base material is maintained substantially at a value determined by the reference value.

5 Claims, 23 Drawing Figures

FIG. 18A    1ST INSTRUCTION SIGNAL FROM 364

FIG. 18B    2ND INSTRUCTION SIGNAL FROM 363

FIG. 18C    ARC CURRENT (WITHOUT BASE CURRENT)

PULSE ARC WELDING MACHINE

BACKGROUND OF THE INVENTION

The present invention relates to pulse arc welding machines. More particularly, the invention relates to a pulse arc welding machine in which a pulsive arc current (hereinafter referred to as "a pulse current") is periodically superposed on a primary welding DC current applied between a wire electrode and a base material. The primary welding DC current is hereinafter referred to as a "base current". The molten portion of the wire electrode is formed into small droplets by an electromagnetic contraction force due to the pulse current. The molten droplets are transferred (hereinafter referred to as "spray-transferred") to the base material thus achieving the welding operation.

There has been previously disclosed a conventional pulse arc welding machine as indicated in FIG. 1. in FIG. 1, the conventional pulse arc welding machine includes a transformer 1 which employs a connection for three-phase to six-phase transformation, thyristors 201 through 206 which subject an AC input voltage to rectification and simultaneously subject the input voltage to voltage transformation by a phase control thereof, an interphase reactor 3 commonly connected between the outputs of the three thyristors 201 through 203 and the outputs of the three thyristors 204 through 206, and a main power source 4 which includes the above described transformer 1, the thyristors 201 through 206 and the interphase reactor 3 for supplying a base current. The pulse arc welding machine also includes another power source 5 which has two secondary windings of multiple turns on the transformer 1 and thyristors 601 and 602 connected respectively to the two secondary windings for superposing a pulse current on a base current. The pulse arc welding machine further includes DC reactors 701 and 702, a wire electrode 8, a wire feeding unit 9 such as a motor for feeding the wire electrode 8, a welding arc 10, and a base material 11 (a material to be welded).

The power sources 4 and 5 are connected at first respective outputs commonly to the connecting point of the DC reactors 701 and 702 and further to the base material 11 through the reactors. The pulse arc welding machine also includes control circuits 12 and 13 for controlling the phases of the thyristors 201 through 206 as well as thyristors 601 and 602 within the power sources 4 and 5, respectively.

The operation of the conventional pulse arc welding machine thus constructed will be described.

When both a base current and a pulse current are applied from the power sources 4 and 5, respectively, between the wire electrode 8 and the base material 11 and the wire electrode 8 is simultaneously fed by the wire feeding unit 9 to the side of the base material 11, the base material 11 is welded. The control circuits 12 and 13 serve to vary the firing phases of the thyristors 201 through 206 as well as thyristors 601 and 602, thereby varying a base current $I_B$, a pulse width $\tau$ and the peak value $I_p$ of the pulse current.

FIGS. 2A and 2B show examples of waveforms of the welding or arc current, i.e., the composite current of the base current and the pulse current. The frequency of the pulse current is equal to or double the fundamental frequency of the power line source. FIG. 2A shows an example of the waveform of the arc current in the case where the mean average current is small, while FIG. 2B shows an example of the waveform of the arc current in the case where the average arc current is large.

For instance, in the case where the thickness of the base material is small, a welding operation is carried out in a small average welding current range (or at a reduced wire feeding speed). More specifically, as is apparent from FIG. 2A, all of the base current $I_B$, pulse width $\tau$ and accordingly peak current value $I_p$ are set small and the pulse frequency is also reduced, for example, from 120 Hz to 60 Hz in some instances.

On the other hand, in the case where the thickness of the base material is large, an average welding current (or the wire feeding speed) is increased in the welding operation. Accordingly, as is apparent from FIG. 2B, all of the base current $I_B$, pulse width $\tau$ and accordingly peak current value $I_p$ are set large.

Thus, when a welding operation is carried out in a small average welding current range with the conventional pulse arc welding machine constructed as described above, as indicated in FIG. 2A, the peak current value $I_p$ is small and accordingly an electromagnetic contraction force due to the pulse current is also small. Therefore, it is difficult to transfer the molten metal in the form of small droplets 14. That is, the molten portion of the wire electrode is transferred in the form of a considerably large molten metal drop to the base material 11, as shown in FIG. 3A, as a result of which the wire electrode 8 is readily short-circuited with the base material 11 upon transfer of the wire electrode to the base material so that the molten portion of the wire tends to splatter due to the short-circuiting current thus flowing in this case.

On the other hand, when a welding operation is carried out with a large average welding current as is apparent from FIG. 2B, the pulse width $\tau$ and the peak current value $I_p$ is large. Thus, the quantity of heat applied to the wire per pulse period is excessively large so that the molten droplets 14 tend to droop as shown in FIG. 3C. As a result, if the arc length is set short, the wire is short-circuited with the base material resulting in splattering.

If, as shown in FIGS. 3A and 3C, a welding operation is carried out by eliminating splatter, the arc length cannot be set short, as a result of which an undercut will be created in the base material. This is a welding defect which makes it impossible to increase the welding speed.

The conventional pulse arc welding machine has a difficulty in adjustment in that, in order to obtain a short arc length as shown in FIG. 3B and a suitable molten droplet transfer state in which little undercutting occurs in the base material and the welding speed can also be increased, the pulse width $\tau$, peak current value $I_p$ and base current value $I_B$ must be selected within strict limits.

As described above, the conventional pulse arc welding machine has a difficulty in adjustment for obtaining a satisfactory molten droplet transfer state. Accordingly, an operator must set the constants used for the welding operation for each welding operation, and this must be done using only his own experience as a guide. This does not always result in an optimum value. Thus, the conventional pulse arc welding machine has a number of significant drawbacks.

Furthermore, even if in the conventional pulse arc welding machine the above-described welding factors are properly set, since the control circuit 13 controls the firing phases of the thyristors 601 and 602 as well as the average pulse current, the instantaneous values cannot be controlled so that the momentary molten droplet transfer state due to variations in the arc load becomes irregular and the pulse repetition frequency influences the frequency of the power source. Accordingly, the welding current range in which the optimum molten droplet transfer state is obtained is limited.

Moreover, even if in the conventional pulse arc welding machine only the pulse width, pulse frequency and wire feeding speed and the like are individually adjusted, as described above, to stabilize the welding arc at the time of starting the welding operation, no correction function is provided to compensate for variations in the arc length which are caused by various fluctuations during the welding operation. Accordingly, the conventional pulse arc welding maching further suffers from various drawbacks such as variations in the arc length, splattering occurring during due to variations in the arc length, variations in the depth of penetration, short arcing or an undercutting due to irregular base material and operator caused fluctuations frequently occurring during the welding operation.

SUMMARY OF THE INVENTION

Accordingly, a primary object of the present invention is to provide a pulse arc welding machine in which all of the above-described difficulties accompanying a conventional pulse arc welding machine are eliminated and a satisfactory molten droplet transfer state is attained without splattering and over a wide average welding current range and wire feeding speed range.

Another object of the invention is to provide a pulse arc welding machine in which the arc length is short, improper welding such as undercut or the like is eliminated and in which the welding speed is improved.

A further object of the invention is to provide a pulse arc welding machine in which the arc voltage is always retained within a predetermined value by automatically varying at least one of the welding factors such as the pulse width, pulse frequency and peak current value of the pulse current, the base current, and the amount of wire fed when the arc length is varied, thereby eliminating variations in arc length due to operator-caused errors.

A still further object of the invention is to provide a pulse arc welding machine in which satisfactory values of a variety of welding factors are automatically set for various welding conditions corresponding to various combinations of wire diameter, quality of the wire, shielding gas components, and the like, and in which the selection of satisfactory values for welding factors properly corresponding to various welding conditions can be easily set.

Still another object of the invention is to provide a pulse arc welding machine in which the relations between the amount of wire fed and the arc voltage is specified to thereby control both the amount of wire fed and the arc voltage, in which the pulse width is varied in accordance with variations in the arc voltage corresponding to variations in the arc length so that the arc voltage is maintained always at a predetermined value thereby eliminating variations in the arc length due to the operator-caused fluctuations or the like and in which satisfactory molten droplet transfer is maintained.

Still another object of the invention is to provide a pulse arc welding machine in which the relations between the amount of wire fed and the pulse frequency is defined to thereby control both the amount of wire fed and the pulse frequency, in which the pulse frequency is varied in accordance with variations in the amount of wire fed thereby maintaining satisfactory pulse transfer and accordingly performing welding operations with a small arc length.

A particular object of the invention is to provide a pulse arc welding machine in which an optimum pulse frequency can be selected for a welding operation without influencing the frequency of the power source and in which the peak pulse current value can be maintained at a predetermined value regardless of the variations in the arc load.

In accordance with these and other objects of the invention, there is provided a pulse arc welding machine including a wire electrode, a wire feeding unit for feeding the wire electrode to a base material, a base current source for supplying a base current flowing between the wire electrode and the base material, a pulse current source for supplying a pulse current superposed on the base current flowing between the wire electrode and the base material, a detector for the detecting an arc discharge voltage between the wire electrode and the base material, and a controller for comparing the detected output value from the detector with a preset reference value for controlling the amount of heat applied to the wire electrode such that the arc voltage between the wire electrode and the base material is maintained substantially at a value determined by the reference value.

The pulse current source is connected between an arc section between the wire electrode and the base material and DC power source. The pulse current source is composed of a switching element adapted to open and close under control of a signal produced by the controller. The controller includes means for automatically varying welding factors to control the amount of heat applied to the wire electrode. The welding factor may be at least one of the pulse width of the pulse current, the frequency of the pulse current, the peak value of the pulse current, the base current, and the wire feeding rate.

The nature, principle and utility of the invention will become more apparent from the following description when read in conjunction with the accompanying drawings.

BRIEF DESCRIPTION OF THE DRAWINGS

In the accompanying drawings:

FIGS. 18A through 18C are explanatory diagrams of the waveforms of a signal obtained from the circuit shown in FIG. 17 and output currents therefrom.

DESCRIPTION OF THE PREFERRED EMBODIMENTS

Figure 4:
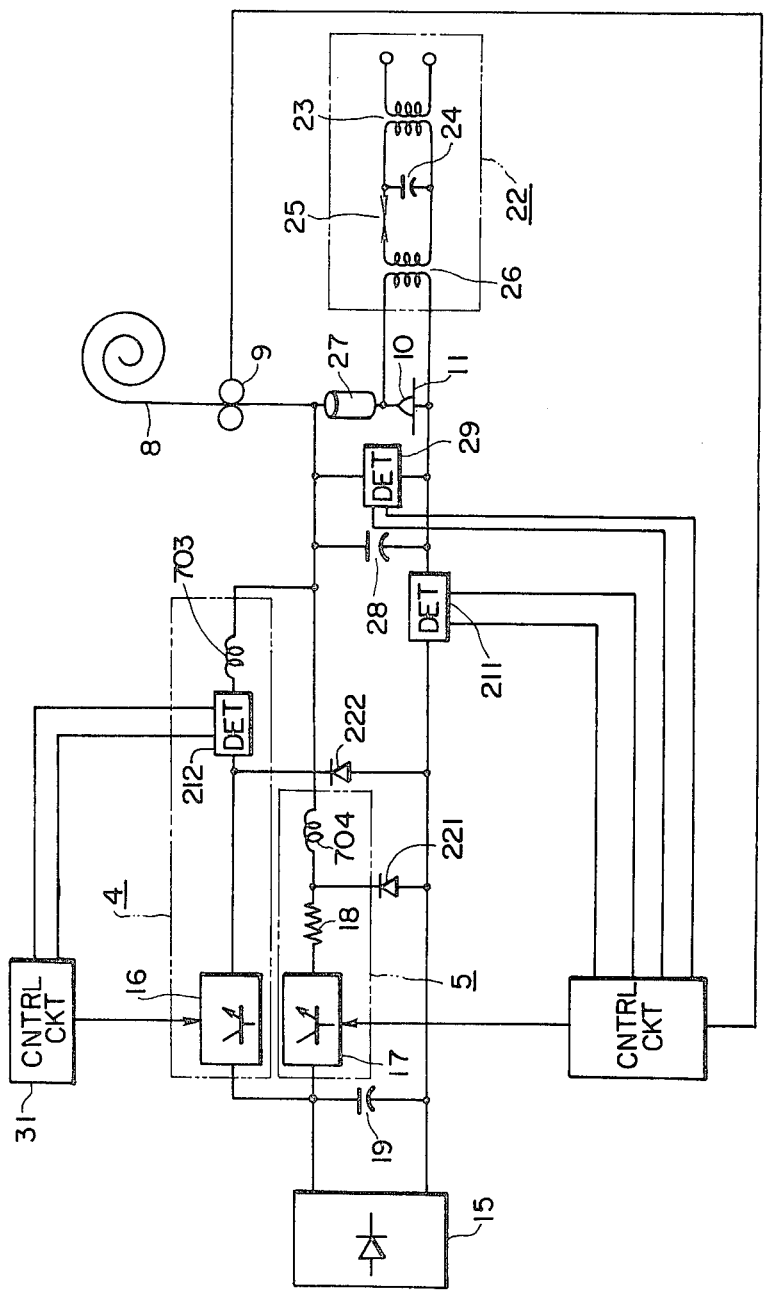
FIG. 4 is a circuit diagram showing the arrangement of a first preferred embodiment of a pulse arc welding machine constructed according to the invention.

A first preferred embodiment of a pulse arc welding machine according to the invention will now be described with reference to the drawings, particularly to FIG. 4 showing a first embodiment of the invention, wherein like reference numerals designate the same parts as in the other figures.

In FIG. 4, reference numeral 15 designates a DC power source which includes a transformer and diodes and the like. A power source 4 includes a switching circuit 16 such as a transistor which can connect or disconnect a current upon reception of a control signal, a DC reactor 703 for protecting a power supply circuit from short circuiting and for shaping a pulse current waveform, and a detector 212 for detecting a base current.

A power source 5 also includes a switching circuit 17 such as a transistor which can connect or disconnect a current upon reception of a control signal and a DC reactor 704 for protecting a power supply circuit from short circuiting and for shaping a pulse current waveform. The switching circuits 16 and 17 may include a number of switching elements connected in parallel depending upon the maximum expected value of the current flowing therethrough. The power source 5 further includes a balance resistor 18 required for parallel operation.

The pulse arc welding machine further includes a capacitor 19 which serves to absorb a surge voltage produced when the switching circuits 16 or 17 close or open in ON or OFF operation, to improve the rise time of the pulse current, and to reduce the ripple of an output current from the DC power source 15; freewheel diodes 221 and 222 which serve to absorb a surge voltage produced after the switching circuit 16 or 17 opens in an OFF operation; a detector 211 for detecting a welding current; a high frequency power source 22; a step-up transformer 23; a capacitor 24; a spark gap 25; a coupling coil 25 for introducing a high frequency voltage to an arc load; a high frequency reactor 27 made of a magnetic material such as ferrite or the like through which a wire 8 passes; a bypass capacitor 28 for preventing the application of the above-described high-frequency high voltage to the transformer in the power source 15; and an arc voltage detector 29 for detecting an arc voltage.

Figure 1:
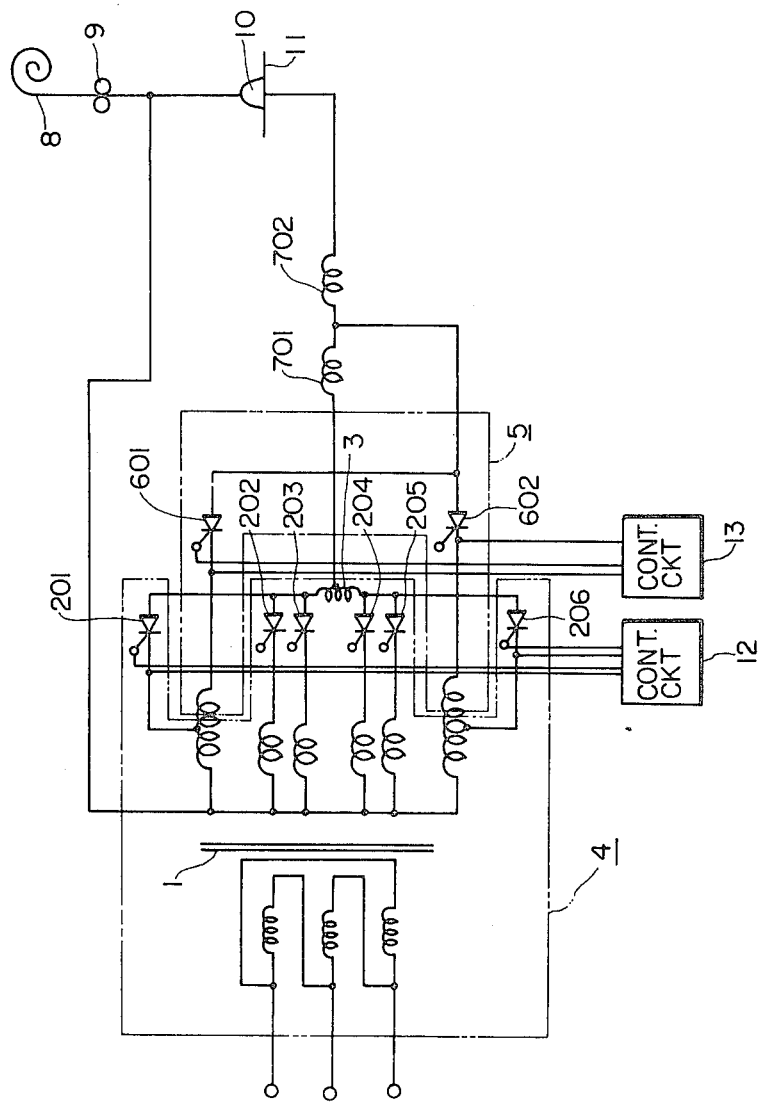
FIG. 1 is a circuit diagram of a power source of a conventional pulse arc welding machine.
Figure 2A:
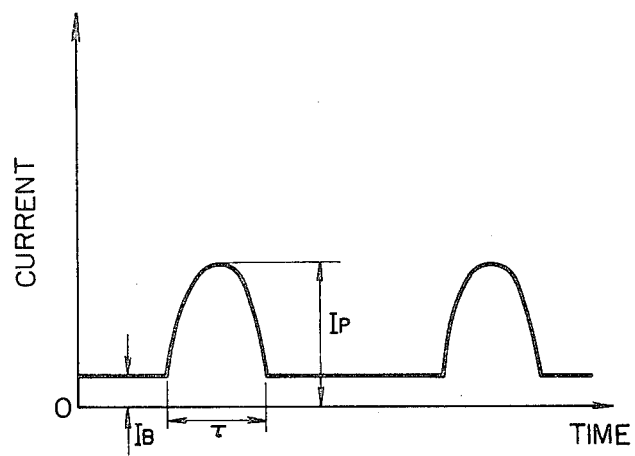
FIGS. 2A and 2B are waveform diagrams of the welding current of the conventional pulse arc welding machine.
Figure 2B:
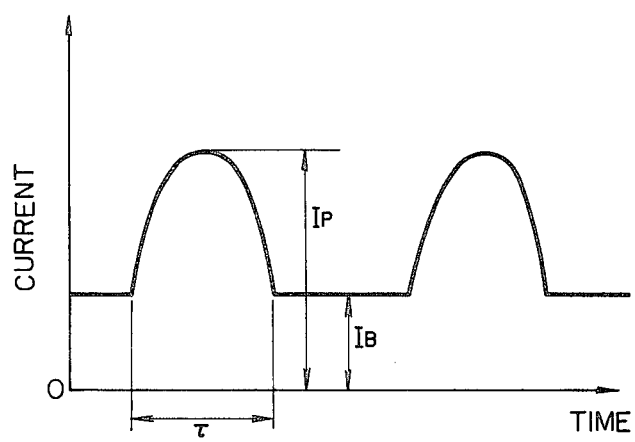

The pulse arc welding machine further includes control circuits 31 and 32 for controlling the opening and closing of the switching circuits 16 and 17, respectively, which produce a control signal in response to a signal from the arc voltage detector 29, welding current detector 211 or base current detector 212. Like reference numerals in FIG. 4 designate the same parts as in FIG. 1.

The operation of the pulse arc welding machine thus constructed will be described.

After being boosted by the step-up transformer 23, an input voltage is applied across the capacitor 24 and accordingly the spark gap 25. When the input voltage thus reaches a certain limit value, a discharge is caused in the spark gap 25. As a result, a series resonance circuit formed by the capacitor 24 and the coupling coil 26 produces a high-frequency high voltage which is applied between the wire electrode 8 and the base material 11 through the coupling coil 26. In this operation, application of the high-frequency high voltage to the side of the power sources 4 and 5 is prevented by the bypass capacitor 28 while application of the high-frequency high voltage to the wire feeding unit 9 is prevented by the high frequency reactor 27 which serves as a high impedance with respect to the high-frequency high voltage or a high frequency limiting impedance. Thus the power sources and the wire feeding unit are completely protected from the high-frequency high voltage.

An arc is produced even if the wire electrode and the base material are not short-circuited due to an electric discharge caused between the wire electrode and the base material by the high-frequency high voltage. Therefore, in the pulse arc welding machine of the invention, the occurrence of splattering, which might otherwise be caused at the start of a welding operation, is prevented. When the arc starts, the wire electrode 8 is simultaneously fed by the wire feeding unit 9 toward the base material direction to perform the welding operation.

An arc current is supplied by the DC power source in such a manner that a DC current supplied from the power source is switched ON or OFF by the switching circuit 17 and is thus formed into a pulse current. (The arc current flows through the freewheel diode 221 and the DC reactor 704 immediately after the switching circuit 17 is opened in the OFF operation). In addition, a base current is formed in such a manner that the DC current supplied from the power source is switched ON or OFF by the switching circuit 16. (The base current flows through the freewheel diode 222 and the DC reactor 703 immediately after the switching circuit 16 is opened in the OFF operation.) Simultaneously, the detector 211 sequentially detects the arc current at all times. The outputs from the detector 211 are applied to the control circuit 32 which controls the switching circuit 17 so that the peak current value $I_p$ will fall within a predetermined range determined by a combination of the quality of the wire electrode, the diameter of the wire and the type of shielding gas. The detector 212 also sequentially detects the base current at all times. The outputs from the detector 212 are applied to the control circuit 31 which controls the switching circuit 16 so that the base current falls within a predetermined range determined primarily by the diameter of the wire.

The control circuit 32 also serves to control the relations between the pulse frequency and the wire feeding speed as well as between the average arc voltage value detected by the detector 29 and the pulse width.

Figure 5:
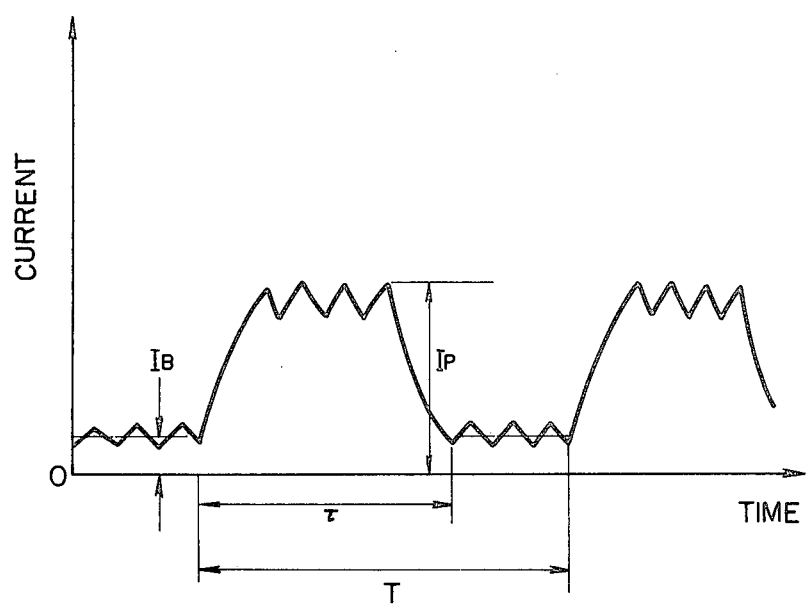
FIG. 5 is a waveform diagram showing a welding current in the pulse arc welding machine of the invention.

The waveform of the arc current is as shown in FIG. 5. A method of setting a pulse frequency, a pulse width τ, a peak current value $I_p$ and a base current value $I_B$ will be described in detail with reference to FIG. 5. The base current value $I_B$ is set in accordance with the average value of a pulsating current.

The peak current value $I_p$ must be set to exceed a so-called critical current value, which is determined according to the material of the wire employed, the diameter of the wire and the type of shielding gas employed required to transfer the metal of the wire by melting the wire to form a molten droplet at the spray shift time. However, if the peak current value is excessively large, then the force of the arc to the side of the base material will be increased causing the welding bead to be undesirably distorted in shape. Accordingly, it is necessary to set the peak value $I_p$ to a value higher than the critical current value, which is constant irrespective of the average current value, and to set the average arc current value to a predetermined maximum value if the period T of the pulse is increased while the peak value $I_p$ remains constant.

Examples of the value range of the peak value $I_p$ with respect to the combination of the material of the wire, the diameter of the wire and the type of the shielding gas are indicated in the following Table 1:

molten droplet is shaped by an electromagnetic contraction force is determined by a combination of:

(a) the electromagnetic force acting on the droplet toward the base material, (b) the surface tension of the droplet toward the wire, and (c) the force of gravity.

Figure 3A:
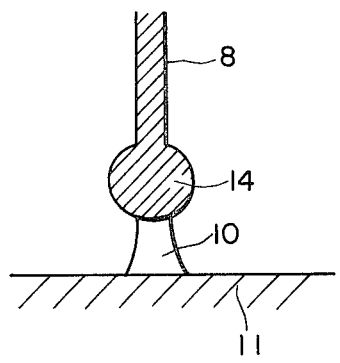
FIGS. 3A through 3C are explanatory diagrams showing various states of molten droplets transferring to a base material.
Figure 3B:
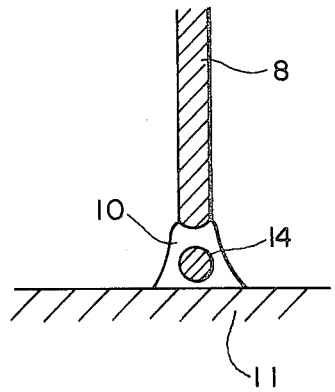
Figure 3C:
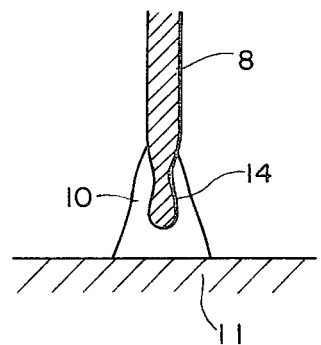

The results of actual measurements of the size (or the diameter a) of droplets in the case where a satisfactory molten transfer as shown in FIG. 3B occurs are indicated in Table 1.

In order to reduce splattering as much as possible, even in the case where the length of the arc is reduced, it is necessary to make the diameter a of the droplets as small as possible. More particularly, it is necessary to effect only one molten droplet transfer per pulse with the diameter of the droplet as indicated in Table 1. Accordingly, the relations between the wire feeding speed v (cm/s) and the pulse frequency f (Hz) can be expressed by the following equation:

$$\pi \left(\frac{d}{2}\right)^2 \cdot v \cdot \frac{1}{100} = \frac{4}{3} \pi \left(\frac{a}{2}\right)^3 \cdot f \cdot \frac{1}{1000}, \text{ and}$$

$$\frac{v}{f} = \frac{1}{15} \cdot \frac{a^3}{d^2},$$

where the diameter of the droplet is represented by a (mm) and the diameter of the wire is represented by d (mm). It is to be noted that the amount of wire fed per second is equal to the amount of metal transferred as the droplet.

Table 1 also indicates the diameters of the wires and the range of v/f corresponding to the diameter of the droplet of the molten wire.

The quantity W of heat applied to the wire by the current during one pulse period is considered to be satisfactory to melt wire in an amount corresponding to

TABLE 1

| Material of Wire & Type of Shielding Gas | Wire Diameter | | |
|---|---|---|---|
| | 0.9 mmφ | 1.2 mmφ | 1.6 mmφ |
| Soft Steel Ar/CO₂ = 8/2 | $I_p$ = 250–300 A<br>a = 0.99–1.43 mmφ<br>v/f = 0.080–0.241 cm/Hz·s<br>W = 4.96–14.6 Joule | $I_p$ = 370–430 A<br>a = 1.14–1.44 mmφ<br>v/f = 0.068–0.138 cm/Hz·s<br>W = 7.4–15.1 Joule | $I_p$ = 550–600 A<br>a = 1.24–1.46 mmφ<br>v/f = 0.050–0.081 cm/Hz·s<br>W = 9.4–15.7 Joule |
| Soft Steel Ar/O₂ = 97/3 | $I_p$ = 220–250 A<br>a = 0.92–1.25 mmφ<br>v/f = 0.064–0.161 cm/Hz·s<br>W = 3.94–9.89 Joule | $I_p$ = 300–350 A<br>a = 0.97–1.30 mmφ<br>v/f = 0.042–0.102 cm/Hz·s<br>W = 4.62–11.1 Joule | $I_p$ = 400–450 A<br>a = 1.09–1.53 mmφ<br>v/f = 0.034–0.093 cm/Hz·s<br>W = 6.55–18.1 Joule |
| Stainless Steel Ar/O₂ = 97/3 | | $I_p$ = 250–300 A<br>a = 0.90–1.43 mmφ<br>v/f = 0.034–0.135 cm/Hz·s<br>W = 3.69–14.8 Joule | |
| Aluminum Ar | | | $I_p$ = 270–330 A<br>a = 1.29–1.52 mmφ<br>v/f = 0.056–0.091 cm/Hz·s<br>W = 3.02–4.92 Joule |

Next, the relations between the wire feeding speed and the pulse frequency (or the pulse period) will be described.

The diameter of a droplet 14 of the wire metal, which was made molten by the arc heat and the Joule heat produced by a current flowing through the wire where the desired droplet size as indicated in Table 1. For instance, the quantity of heat is calculated on the basis of a wire of soft steel of diameter 1.2 mm and a molten droplet 1.2 mm in diameter under the following conditions:

| Soft steel | |
|---|---|
| Melting point: | 1535° C. (melting point of iron) |
| Latent heat: | 65 cal/g |
| Specific heat: | 0.15 cal/g °C. |
| Density: | 7.8 g/cm³ |
| Ambient temperature: | 0° C. |

The quantity W of the heat is thus 2.08 cal (8.74 Joule).

Table 1 also indicates the material of the various wires, the diameters of the wires, and the type of the shielding gas, and the optimum heat range applied to the wire per pulse. The physical constants employed are as indicated in Table 2 following:

TABLE 2

| | Stainless Steel | Aluminum |
|---|---|---|
| Melting point | 1535° C. | 660° C. |
| Latent heat | 65 cal/g | 95 cal/g |
| Specific heat | 0.15 cal/g° C. | 0.215 cal/g° C. |
| Density | 7.8 g/cm³ | 2.7 g/cm³ |

With the relations among the peak current value, the wire feeding speed and the pulse frequency (or the quantity of heat applied to the wire per pulse) set as described above, molten droplet transfer welding will be performed with a satisfactory diameter of molten droplets.

In an actual welding operation, it is additionally necessary to maintain the length of the arc in a satisfactory range. This is because, if the length of the arc is excessively long, the area of the base material heated is too great. On the other hand, if the length of the arc is excessively short, the molten droplet will cause a short circuit with the base material resulting in splattering.

It is satisfactory to set the length of the arc to about 2 to 3 mm where a wire having a diameter of 0.9 to 1.6 mm is used, as is normally employed for a voltage in a range of 20 to 40 V.

The length of the arc is controlled by detecting the arc voltage and controlling the average arc current, i.e., the quantity of heat applied per pulse and the pulse frequency, so that the detected arc voltage is at a predetermined set value. The quantity of heat applied to the wire can be controlled by varying the pulse width $\tau$, the peak value $I_p$ of the pulse or the base current value $I_B$. When the detected arc discharge voltage is higher than the set reference value, it is necessary to reduce the quantity of heat applied to the wire and to delay the transfer of molten droplets to the base material thereby reducing the length of the arc. On the other hand, if the arc discharge voltage is lower than the set reference value, it is necessary to increase the quantity of heat applied to the wire and to accelerate the molten droplet transfer to the base material thereby increasing the length of the arc.

In order to maintain the arc stable, it is necessary to set the base current value $I_B$ to a value required to prevent extinction of the arc between the pulses. More specifically, in the case of a wire diameter of 0.9 mm, the base current must be at least 10 A, and in the cases of wire diameters of 1.2 mm and 1.6 mm, the base current must be at least 20 to 30 A. The base current should be set lower for a wire of small diameter to correspond to the small average arc current range.

It is noted that the foregoing description is directed to an example of a switching element which employs a transistor. However, the same effect can be obtained by employing a semiconductor element such as gate turn-off thyristor or the like.

Figure 6:
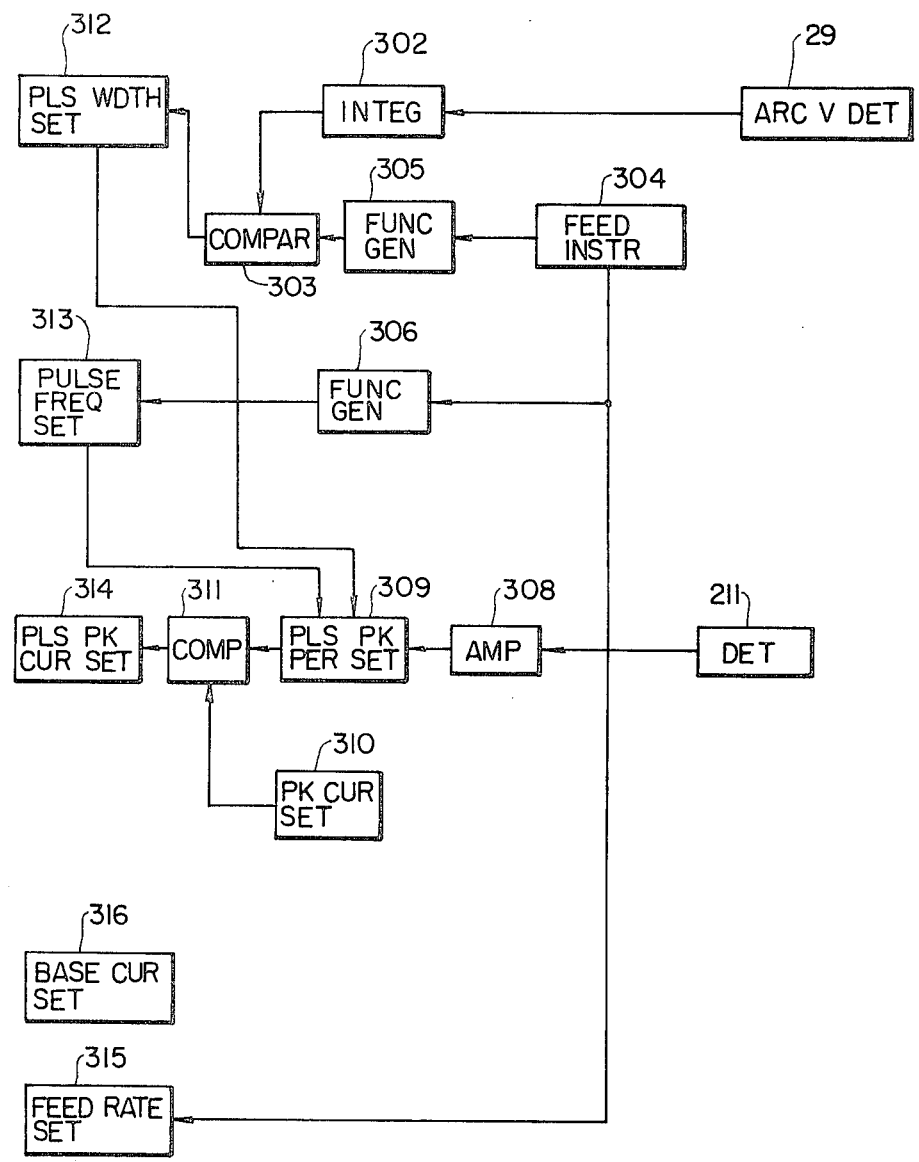
FIG. 6 is a block diagram of a control circuit for controlling the pulse width upon detection of an arc voltage and a welding current.

Next, examples of control circuits 31 and 32 will now be described in detail. FIG. 6 is a block diagram showing an example of a control circuit in the case where an arc voltage and an arc current are detected so that a pulse width is automatically varied thereby controlling the quantity of heat applied to the wire. In FIG. 6, the control circuit includes an arc voltage detecting circuit 29; an integrating circuit 302 responsive to the output from the detecting circuit 29 for integrating the output of the detecting circuit 29; a wire feeding rate instructing circuit 304 for setting the wire feeding speed; a function generator A 305 responsive to output from the instructing circuit 304 for defining the relation between the wire feeding rate and the arc voltage; a comparator A 303 which compares the output from the function generator A 305 with the output from the integrating circuit 302; a pulse width setting circuit 312 responsive to the output from the comparator A 303 for varying the pulse width; a function generator B 306 responsive to the output from the wire feeding rate instructing circuit 304 for defining the relations between the wire feeding rate and pulse frequency; a pulse frequency setting circuit 313 responsive to the output from the function generator B 306 for varying the pulse frequency; an arc current detecting circuit 211, an amplifying circuit 308 for amplifying the output from the detecting circuit 211; a pulse peak period selecting circuit 309 responsive to the output from the amplifier circuit 308, the output from the pulse width setting circuit 312 and the output from the pulse frequency setting circuit 313 for selecting a pulse peak period; a peak current value instructing circuit 310 for setting the peak value of the pulse current; a comparator B 311 which compares the output from the instructing circuit 310 with the arc current value during the peak period of the pulse selected by the selecting circuit 309; a pulse peak current setting circuit 314 responsive to the output from the comparator B 311 for varying the peak value of the pulse current; a wire feeding rate setting circuit 315 responsive to the output from the instructing circuit 304 for varying the wire feeding rate; and a base current setting circuit 316.

Figure 7:
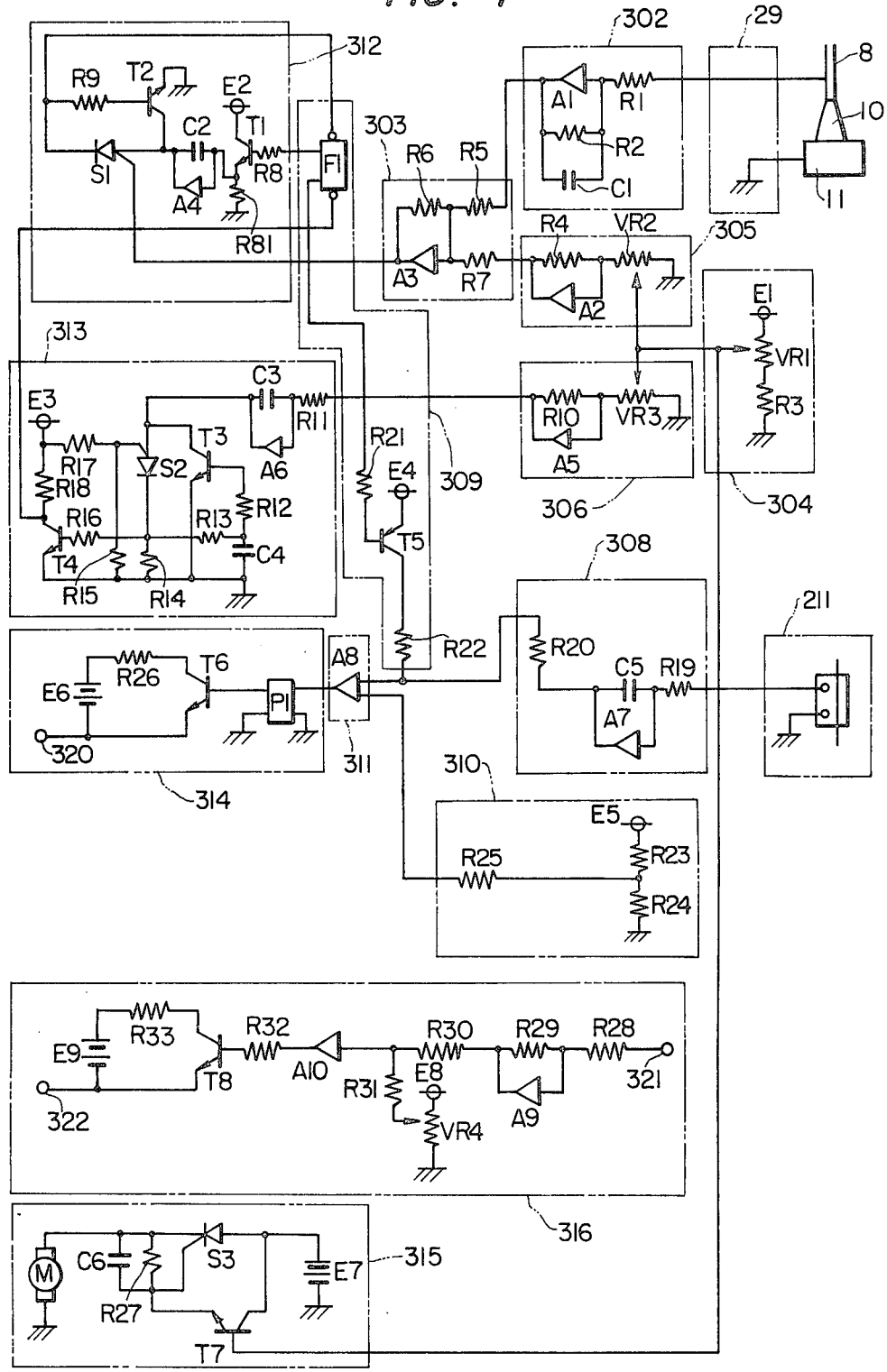
FIG. 7 is a circuit diagram showing the circuit arrangement of the circuit shown in block diagram form in FIG. 6.

An example of a specific circuit arrangement of the control circuit shown in FIG. 6 is shown in FIG. 7. In FIG. 7, an arc voltage at the wire electrode 8 is detected by the arc voltage detecting circuit 29, which in turn produces an arc voltage detection output signal which is coupled to the input of the integrating circuit 302.

The integrating circuit 302 includes an input resistor R1 which is connected at its input terminal to the output of the detecting circuit 29 and which is connected at its output terminal to an input of an amplifier A1 which amplifies the arc voltage detection signal from the detecting circuit 29, and a resistor R2 and a capacitor C1 connected in parallel with the amplifier A1. The amplifier A1 produces an amplified arc voltage detecting signal at its output.

The wire feeding rate instructing circuit 304 includes a power source E1, a variable resistor VR1 connected at one end to the power source E1 for varying a voltage signal corresponding to the wire feeding rate instruction value from its common output terminal, and a resistor R3 connected in series with the resistor VR1 and to ground. Thus, the wire feeding rate instructing circuit 304 produces a set wire feeding rate instruction signal from the output terminal of the variable resistor R3.

The wire feeding rate instruction output signal from the instructing circuit 304 is applied to the inputs of the function generators A 305 and B 306. The function generator A 305 includes a variable resistor VR2 which is connected at one end to ground and at the other end to the connecting point of a resistor R4 and an input of an amplifier A2 while the center terminal of the variable resistor VR2 is connected to the output of the instructing circuit 304 for varying the wire feeding rate instruction signal from the instructing circuit 304; an amplifier A2 for amplifying the wire feeding rate instruction signal from the instructing circuit 304; and a resistor R4 connected in parallel with the amplifier A2. The output of the amplifier A2 defines the relations between the wire feeding rate and the arc voltage wherein the arc voltage is set according to the set wire feeding rate instruction signal.

The outputs from the integrating circuit 302 and the function generator A 305 are applied to the inputs of the comparator A 303. The comparator A 303 includes an input resistor R5 which is connected at one end to the output of the integrating circuit 302 and which is connected at the other end to the connecting point of an amplifier A3 and a resistor R6, an input resistor R7 which is connected at one end to the output of the function generator A 305 and which is connected at the other end to the connectiong point of the amplifier A3 and the resistor R6. The amplifier A3 is used for comparing the arc voltage detection signal from the integrating circuit 302 with the set arc voltage from the function generator A 305 and outputting a differential signal therebetween.

The compared output from the conparator A 303 is applied to the input of the pulse width setting circuit 312. The pulse width setting circuit 312 includes an N gate thyristor S1 responsive to the compared output from the comparator A 303 at its gate for operating the pulse peak period selecting circuit 309, which will be hereinafter described in detail, and a drive circuit for driving the thyristor S1. The drive circuit includes an input resistor R9 connected at one end to the output of the thyristor S1, a transistor T2 coupled to the output from the thyristor S1 through the resistor R9 for driving the anode of the thyristor S1, a power source E2, a transistor T1 coupled to the output from the pulse peak period selecting circuit 309 through an input resistor R8 with the predetermined voltage from the power source E2 connected to the collector thereof for driving the anode of the thyristor S1 through an amplifier A4 and a resistor 81. A capacitor C2 is connected across the amplifier A4. The amplifier A4 amplifies the output from the transistor T1. Thus, the pulse peak period selecting circuit 309 serves to set the pulse peak period.

The function generator B 306 includes, similarly to the aforementioned function generator A 305, a variable resistor VR3, which is connected at one end to ground, connected at the other end to the connecting point of a resistor R10 and an input of an amplifier A5 and at its center terminal to the output of the instructing circuit 304 for varying the wire feeding rate instruction signal from the instructing circuit 304; and an amplifier A5 for amplifying the wire feeding rate instruction signal from the instructing circuit 304. A resistor R10 is connected across the amplifier A5. The output of the amplifier A5 defines the relations between the wire feeding rate and the pulse frequency wherein the set wire feeding rate instruction signal from the instructing circuit 304 to the center terminal of the variable resistor VR3 is varied in response to the setting of the variable resistor VR1 in the instructing circuit 304.

The wire feeding rate signal is coupled through the function generator B 306 from the instructing circuit 304 and applied to the input of the pulse frequency setting circuit 313. The pulse frequency setting circuit 313 includes an input resistor R11 which is connected at one end to the output of the function generator B 306, an amplifier A6 receiving the wire feeding rate signal through the resistor R11 from the function generator B 306 with a capacitor C3 connected across the amplifier A6, an N gate thyristor S2 responsive to the wire feeding rate signal from the amplifier A6 at anode and which drives a transistor T4, a transistor T3 connected at its collector to the input and connected at its base through a resistor R12 and a capacitor C4 as well as resistors R13 and R14 to the thyristor S2, a power source E3, a transistor T4, coupled to the output of the thyristor S2 through an input resistor R16 with the voltage from the power source E3 connected to its collector through a resistor R18, for producing a varying pulse frequency in response to the signal from the function generator B 306, thereby producing a pulse signal when the input pulse frequency signal from the function generator B 306 reaches a predetermined voltage, and a resistor R17 connected between the power source E3 and the gate of the thyristor S2 together with a resistor R15 connected at the other end thereof to ground.

The arc current detecting circuit 211 includes a shunt resistor for detecting the arc current flowing through the wire electrode.

The detected arc current output from the detecting circuit 211 is applied to an input of the amplifying circit 308. The amplifying circuit 308 includes an input resistor R19, and amplifier A7 receiving the detected arc current signal from the detecting circuit 211 through the resistor R19 for amplifying the detected arc current signal with a capacitor C5 having connected across the amplifier A7, and an output resistor R20 connected to the output of the amplifier A7.

The amplified detected arc current signal from the amplifying circuit 308 is in turn applied to the input of the pulse peak period selecting circuit 309. The pulse peak period selecting circuit 309 includes a flip-flop F1 receiving the pulse width output signal from the pulse width setting circuit 312 for producing a set pulse width signal, a resistor R21 connected between the flip-flop F1 and a transistor T5, the transistor T5 receiving the set pulse width signal from the flip-flop F1 with a voltage from a power source E4 at its emitter for producing a set pulse width output signal coupled through a resistor R22 thereby to set the pulse peak period in response to the arc current detected by the detecting circuit 211 and which is coupled through the amplifier circuit 308 with a pulse frequency set by the pulse frequency setting circuit 313 which controls the flip-flop F1.

A peak current value instructing circuit 310 includes a power source E5, dividing resistors R23 and R24 connected in series between ground from the power source E5 for producing a divided predetermined peak current value from the connecting point of the resistors R23 and R24 through an output resistor R25. Thus the instructing circuit 310 produces a pulse peak current value instruction signal.

The peak current value signal from the instructing circuit 310 is applied to a first input of the comparator B 311. The pulse peak period output from the selecting circuit 309 is also applied to a second input of the comparator B 311. The comparator B 311 includes a comparison amplifier A8 which compares the arc current value during the peak period of the pulse selected by the selecting circuit 309 with the pulse peak current value instruction signal from the instructing circuit 310 producing a comparison output in response thereto.

The comparison output from the comparator B 311 is applied to an input of the pulse peak current setting circuit 314. The pulse peak current setting ciruit 314 includes a photocoupler P1 responsive to the comparison signal from the comparator B 311 for producing a comparison output signal, a transistor T6 responsive to the comparison output from the photocoupler P1 for amplifying the comparison signal, and a resistor R26 connected at one end to the collector of the transistor T6 and at the other end to a power source E6, with the positive terminal of power source E6 connected through the resistor R26 to the collector of the transistor T6 and the negative terminal to the emitter of the transistor T6 and also to an output terminal 320 for producing a drive signal for the switching circuit 17. Thus, the pulse peak current setting circuit 214 sets the peak value for the pulse current.

The output from the wire feeding rate instructing circuit 304 is also applied to an input of the wire feeding rate setting circuit 315. The setting circuit 315 includes a transistor T7 responsive to the wire feeding rate instruction signal from the instructing circuit 304 for amplifying the instruction signal, a thyristor S3 responsive to the output from the transistor T7 at the gate with a power source E7 connected to the cathode of the thyristor S3, a resistor R27 and a capacitor C6 connected between the transistor T7 and the thyristor S3, and a motor M for feeding the wire electrode 8. The setting circuit 315 energizes the motor M by opening or closing the thyristor S3 so as to pass a current signal through the motor M only when the counterelectromotive force of the motor M is smaller than the wire feeding rate instruction value from the wire feeding rate instructing circuit 304.

The detected base current value signal from the base current detector 212 (in FIG. 4) is applied to the input terminal 321 of the base current setting circuit 316. The base current setting circuit 316 includes an input resistor R28, an amplifier A9 receiving the detected base current value signal from the detector 212 through the terminal 321 and the resistor R28 with a resistor R29 connected across the amplifier A9 which amplifies the input detected base current signal from the detector 212, a coupling resistor R30 connected at one end to the output of the amplifier A9, a power source E8, a variable resistor VR4 connected at one end to the power source E8 and at the other end to ground with the center terminal thereof connected through a resistor R31 to an input of an amplifier A10, the amplifier A10 responsive to the detected base current value signal from the amplifier A9 and a base current value set by the variable resistor VR4 for amplifying for comparison purposes the detected base current with the base current set by the resistor VR4 thereby controlling the ON or OFF state of a transistor T8 through a resistor R32, a resistor R33 connected at one end to the collector of the transistor T8 and at the other end to a power source E9, the power source E9 connected at its positive terminal through the resistor R33 to the collector of the transistor T8 and at its negative terminal to the emitter of the transistor T8 and also to an output terminal 322 for producing a drive signal for the switching circuit 16. Thus, the base current setting circuit 315 sets the base current of the base material.

The operation of the control circuit shown in FIGS. 6 and 7 will be described.

In order to obtain a satisfactory welding state at the time of starting a welding operation using the control circuit thus constructed, the pulse width setting circuit 312, the pulse frequency setting circuit 313 and the pulse peak current setting circuit 314 as well as the base current setting circuit 316 and the wire feeding rate setting circuit 315 are respectively adjusted or controlled as will be described in detail.

In addition to the above-described adjustments prior to the starting of the pulse arc welding machine of the invention, the control circuit thus constructed serves to suitably automatically vary the set values in response to variations in the arc voltage due to change in the length of the arc during the welding operation.

First, the variable resistor VR1 is set to determine the wire feeding rate in the wire feeding rate instructing circuit 304 which sets the wire feeding speed. The set wire feeding rate signal from the instructing circuit 304 is in turn applied to the function generator A 305 which converts the set wire feeding rate signal into a voltage responsive to the wire feeding rate. The voltage from the function generator A 305 is in turn applied to the comparator A 303.

On the other hand, when the wire is fed at the starting time of the pulse arc welding machine of the invention and an arc is generated in the spark gap between the wire electrode and the base material, the arc voltage is detected by the arc voltage detecting circuit 29. The arc voltage thus detected is in turn applied to the integrating circuit 302 where it is smoothed. The smoothed arc voltage thus detected is in turn applied to the comparator 303. Thus, the comparator 303 compares the voltage corresponding to the wire feeding rate from the function generator A 305 with the smoothed arc voltage thus detected from the integrating circuit 302.

The differential voltage between the voltage corresponding to the wire feeding rate from the function generator A 305 and the arc voltage thus detected from the integrating circuit 302 as thus compared is applied sequentially to the pulse width setting circuit 312 which serves to automatically vary the pulse width so that the voltage corresponding to the wire feeding rate becomes equal to the detected arc voltage. For instance, if the length of the arc is set long, the pulse width is set short, and vice versa.

Further, the set wire feeding rate signal from the instructing circuit 304 is also applied to the function generator B306 which serves to define the relations between the wire feeding rate and the pulse frequency and to convert the set wire feeding rate signal into a voltage corresponding to the wire feeding rate. The voltage from the function generator B 306 is in turn applied to the pulse frequency setting circuit 313 which serves to set the pulse frequency.

On the other hand, the arc current signal detected by the arc current detecting circuit 211 is applied to the input of the amplifying circuit 308 which amplifies the detected arc current from the detecting circuit 211. The detected arc current thus amplified is in turn applied to the pulse peak period selecting circuit 309 which separates the detected arc current into an arc current during a base period and an arc current during a peak period.

The arc current during the peak period thus separated is applied from the selecting circuit 309 to the comparator B 311. On the other hand, the pulse peak current value instruction signal from the peak current value instructing circuit 310 is also applied to the comparator B 311. Thus, the comparator B 311 compares the arc current during the peak period from the selecting circuit 309 with the peak current value instruction signal from the instructing circuit 310 to produce a differential voltage therebetween. The differential voltage thus produced is in turn applied to the pulse peak current setting circuit 314 which in response thereto maintains the pulse peak current constant.

The detected base current signal from the base current detector 212 (FIG. 4) is applied to the input terminal 321 of the base current setting circuit 316 which sets the base current of the base material.

Figure 8:
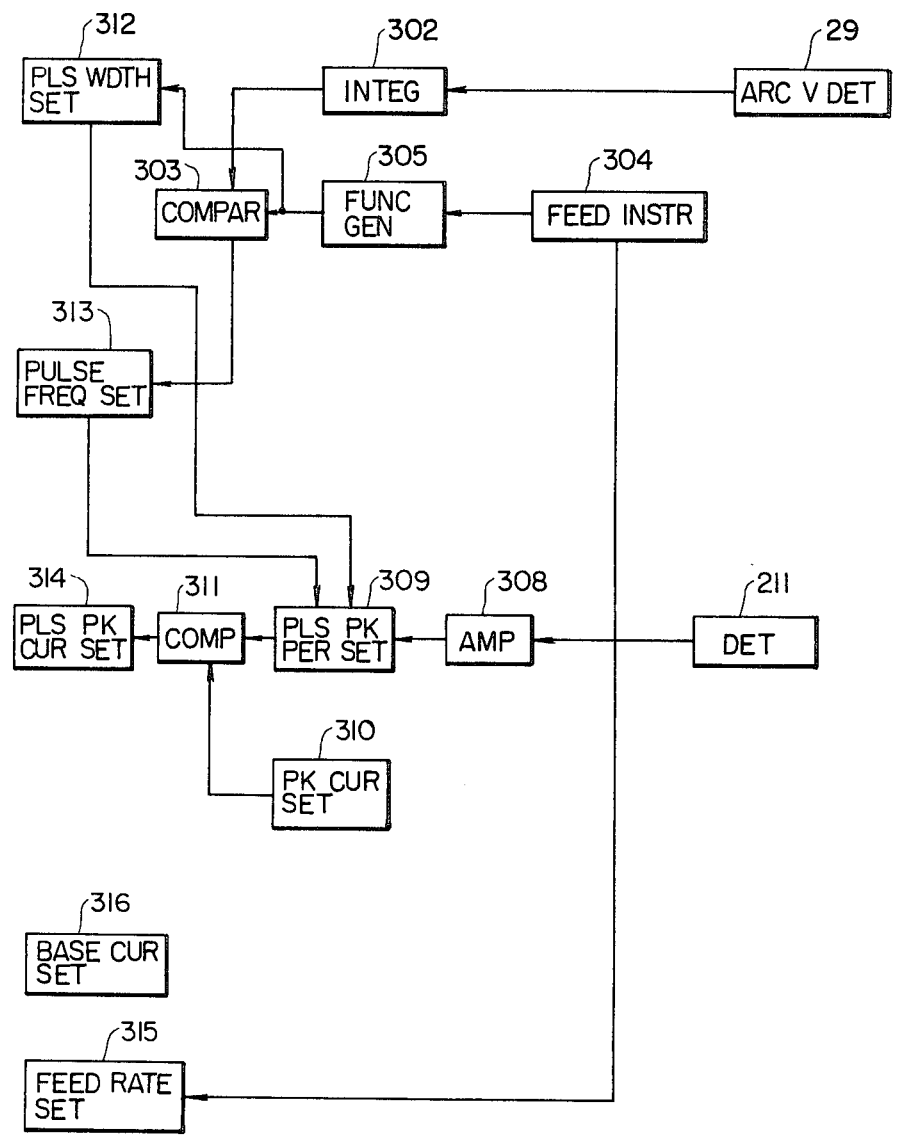
FIG. 8 is a block diagram of another example of a control circuit for controlling the pulse frequency upon detection of an arc voltage.

Another example of the circuit arrangement of the control circuit is shown in block diagram form in FIG. 8. This control circuit is adapted to vary the pulse frequency in response to variations in the arc voltage. The control circuit shown in FIG. 8 differs from that shown in FIG. 6 in that the output from the comparator A 303 is applied to the pulse frequency setting circuit 313 instead of to the pulse width setting circuit 312, the function generator B 306 in the control circuit shown in FIG. 6 is eliminated, and the output from the function generator A 305 is applied to the pulse width setting circuit 312 instead of the output of the comparator A 303.

In the control circuit shown in FIG. 8, all the circuit arrangement in the respective blocks are the same as those in the blocks of the control circuit shown in FIG. 6.

In this control circuit, the pulse frequency setting circuit 313 serves to automatically vary the pulse frequency so that the output from the function generator A 305 becomes equal to the arc voltage, as will be described below in detail. For instance, if the length of the arc is increased, the setting circuit 313 sets the pulse frequency to a low value, and vice versa.

Figure 9:
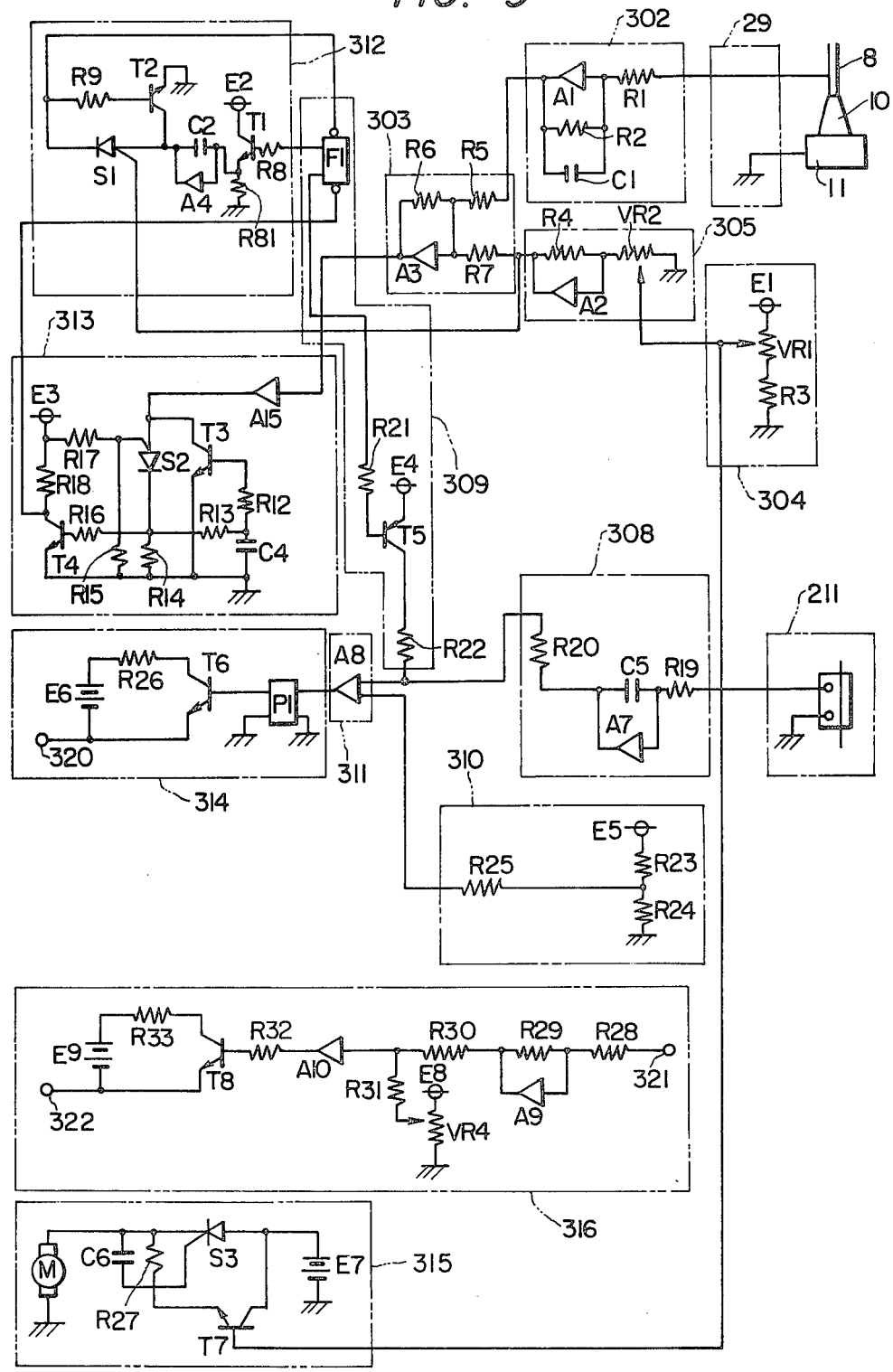
FIG. 9 is a circuit diagram showing a specific circuit arrangement of the control circuit shown in FIG. 8.

Another example of a specific circuit arrangement of the circuit shown in block diagram form in FIG. 8 is indicated in FIG. 9.

In the control circuit shown in FIG. 9, the circuit arrangements of the control circuit are almost the same as those shown in FIG. 7. However, the control circuit shown in FIG. 9 differs from that shown in FIG. 7 in that the function generator B 306 is eliminated, the output signal from the function generator A 305 is applied to the N-gate thyristor S1 in the pulse width setting circuit 312, and the output signal from the comparator A 303 is applied through the amplifier A15 to the N-gate thyristor S2 in the pulse frequency setting circuit 313.

Figure 10:
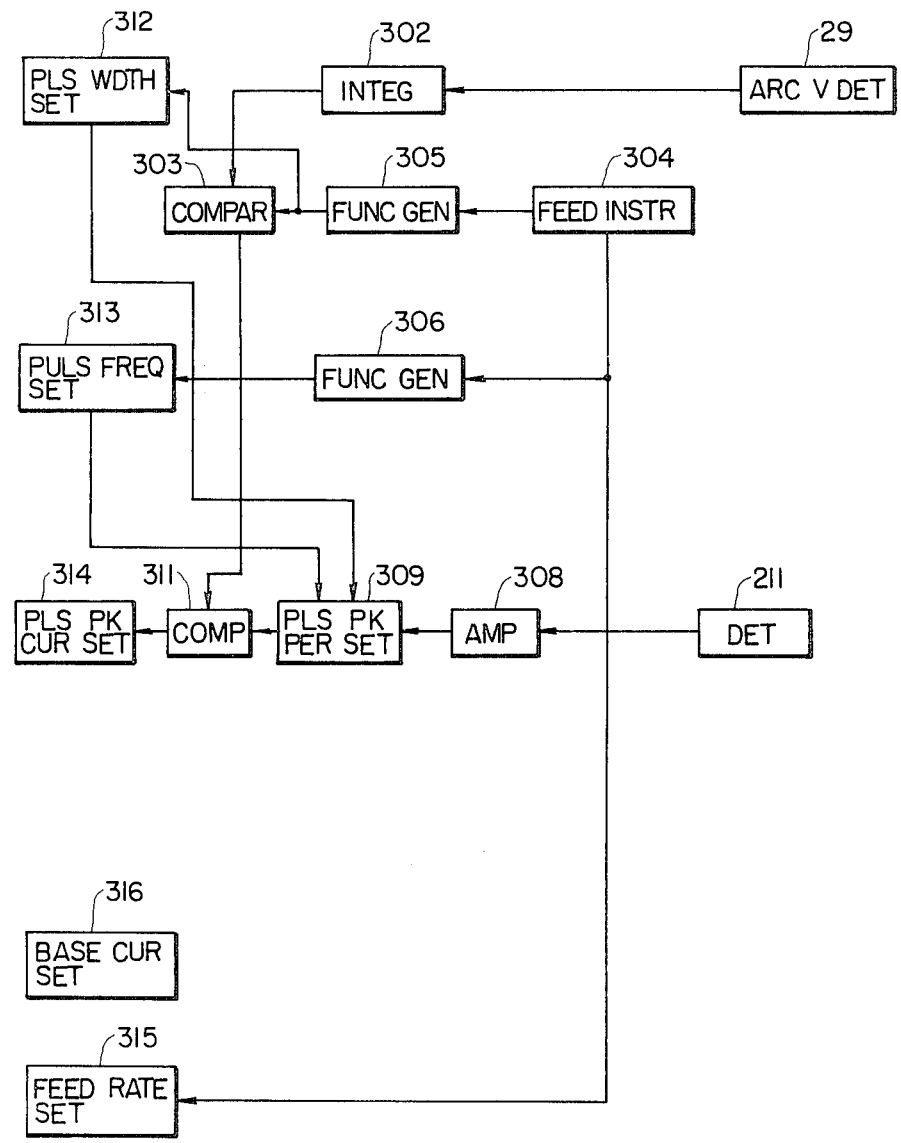
FIG. 10 is a block diagram of a further example of a control circuit for controlling the peak current value upon detection of an arc voltage.

A further example of the circuit arrangement in block diagram form of the control circuit is shown in FIG. 10. This control circuit is adapted to vary the pulse peak current value in response to variations in the arc voltage.

The control circuit shown in FIG. 10 differs from that shown in FIG. 6 in that the output from the comparator 303 is applied to the comparator B 311, the peak current value instructing circuit 310 shown in FIG. 6 is eliminated, and the output from the function generator A 305 is applied to the pulse width setting circuit 312.

In the control circuit shown in FIG. 10, all the circuit arrangements in the respective blocks are the same as those in blocks of the control circuit shown in FIG. 6.

In this control circuit, the comparator B 311 serve to compare the peak current value selected in the pulse peak period selecting circuit 309 with the output from the comparation A 303. The compared output from the comparation B 311 is applied to the pulse peak value setting circuit 314 which serves to automatically vary the peak current value so that the peak current value selected in the selecting circuit 309 is maintained so much as the arc voltage is equal to the predetermined value set in the function generator A 305. For example, if the length of the arc increases, the setting circuit 314 is adjusted to set the peak current value low, and vice versa.

Figure 11:
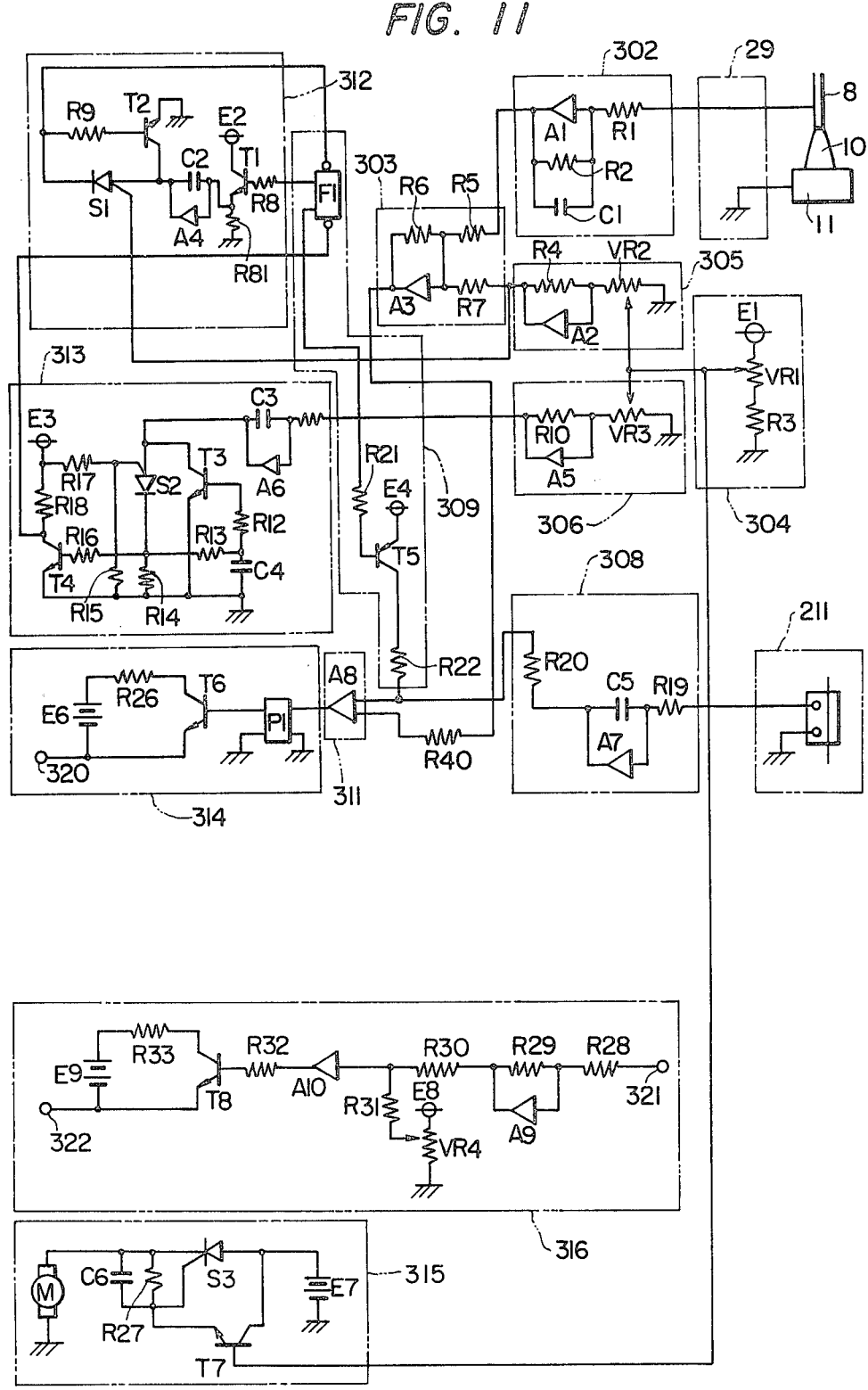
FIG. 11 is a circuit diagram showing a specific circuit arrangement of the control circuit shown in block diagram form in FIG. 10.

A further example of a specific circuit arrangement of the circuit shown in block diagram form in FIG. 10 is indicated in FIG. 11.

In the control circuit shown in FIG. 11, the circuit arrangements of the control circuit are almost the same as those shown in FIG. 7. However, the control circuit shown in FIG. 11 differs from that shown in FIG. 7 in that the peak current instructing circuit 310 is eliminated, the output signal from the function generator A 305 is applied to the N-gate thyristor S1 in the pulse width setting circuit 312, and the output signal from the comparator A 305 is applied through a resistor R40 to the comparator 311.

Figure 12:
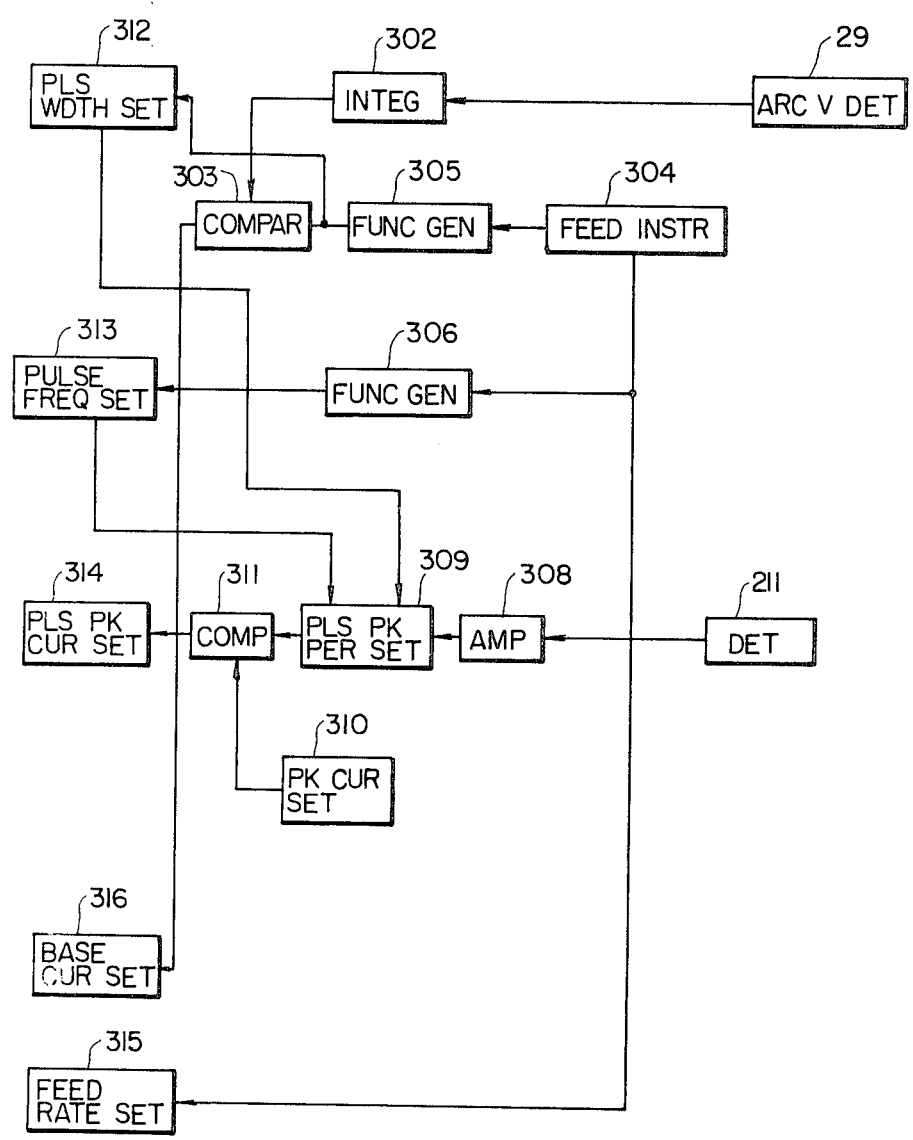
FIG. 12 is a block diagram of a still further example of a control circuit for controlling the base current upon detection of an arc voltage.
Figure 13:
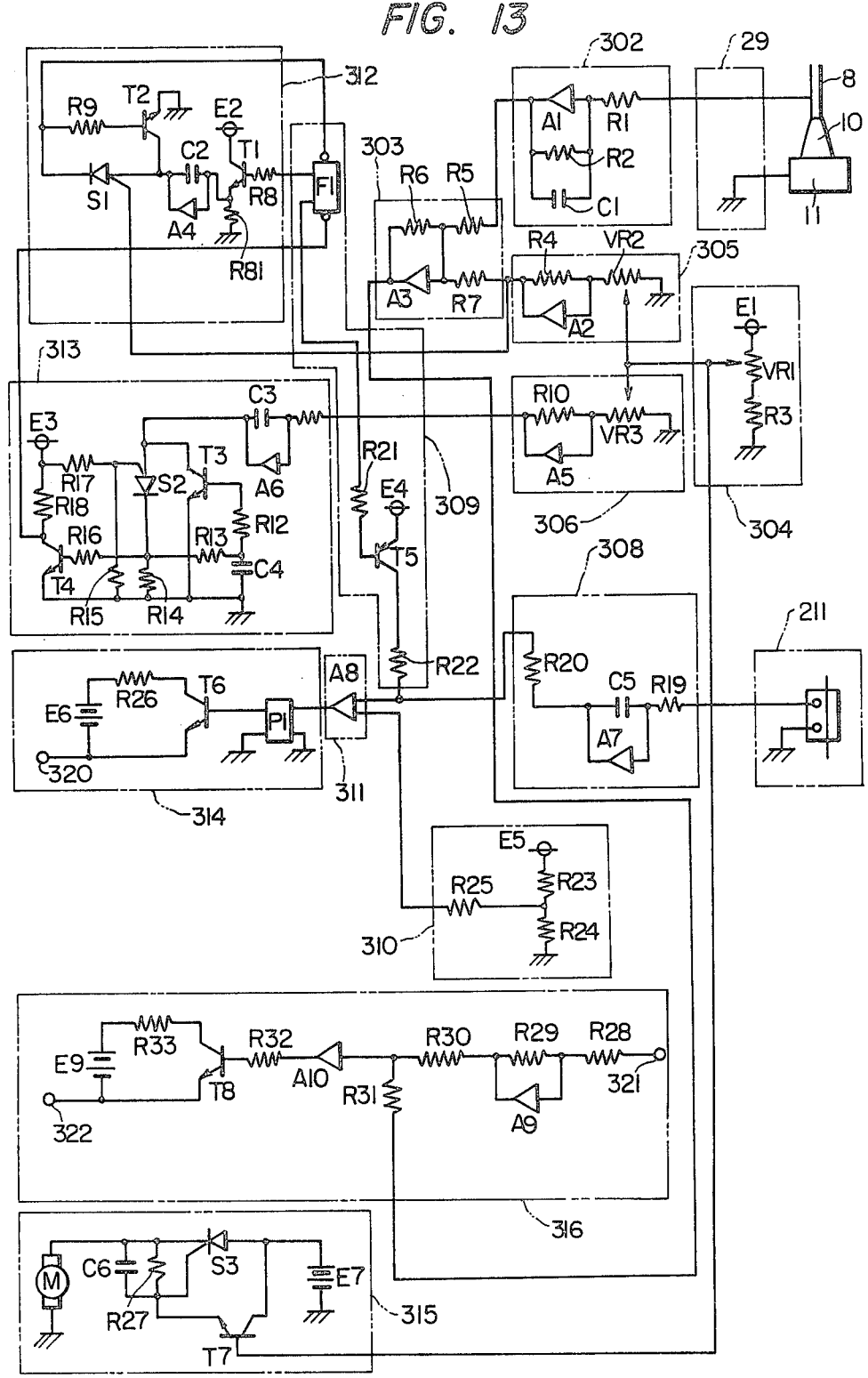
FIG. 13 is a circuit diagram showing a specific circuit arrangement of the control circuit shown in block diagram form in FIG. 12.

A still further example of the circuit arrangement in block diagram form of the control circuit is shown in FIG. 12. This control circuit is provided to vary the base current value in response to the variation in the arc voltage. Specific circuit arrangements of the circuit shown in block diagram form in FIG. 12 are indicated in FIG. 13. The same modification as those shown in FIGS. 8 through 11 are also applied to the circuit arrangements of the control circuit shown in FIGS. 6 and 7. More particularly, the control circuit shown in FIGS. 12 and 13 differs from those shown in FIGS. 6 and 7 in that the output from the function generator A 305 is applied to the pulse width setting circuit 312, and the output from the comparator A 303 is applied to the base current setting circuit 316. Accordingly, the control circuit of this embodiment serves to set the base current low if the length of the arc is increased, and vice versa, in the automatic control mode.

Figure 14:
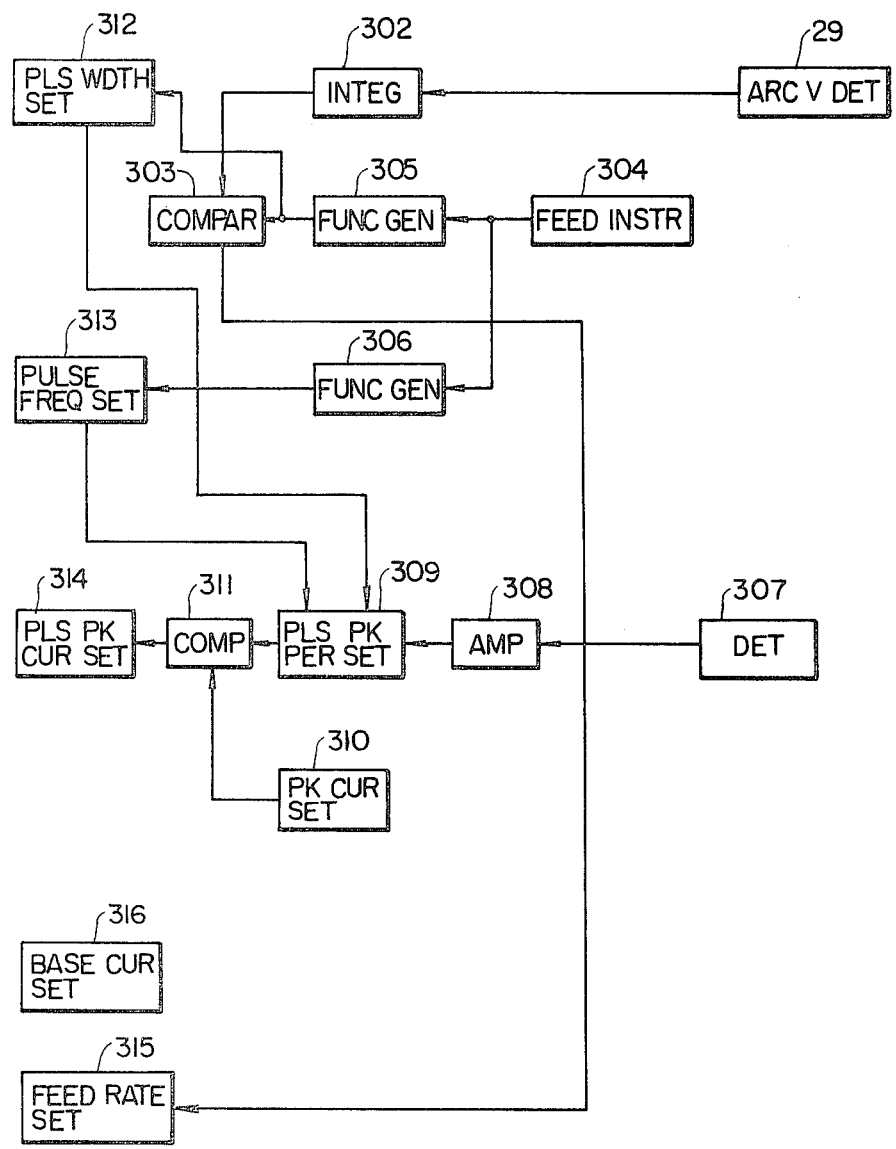
FIG. 14 is a block diagram of still another example of a control circuit for controlling the amount of wire fed upon detection of an arc voltage.

Still another example of the circuit arrangement in block diagram form of the control circuit is shown in FIG. 14. This control circuit is adapted to vary the wire feeding rate in response to variations in the arc voltage. Specific circuit arrangements of the circuit shown in block diagram form in FIG. 14 are indicated in FIG. 15.

Figure 15:
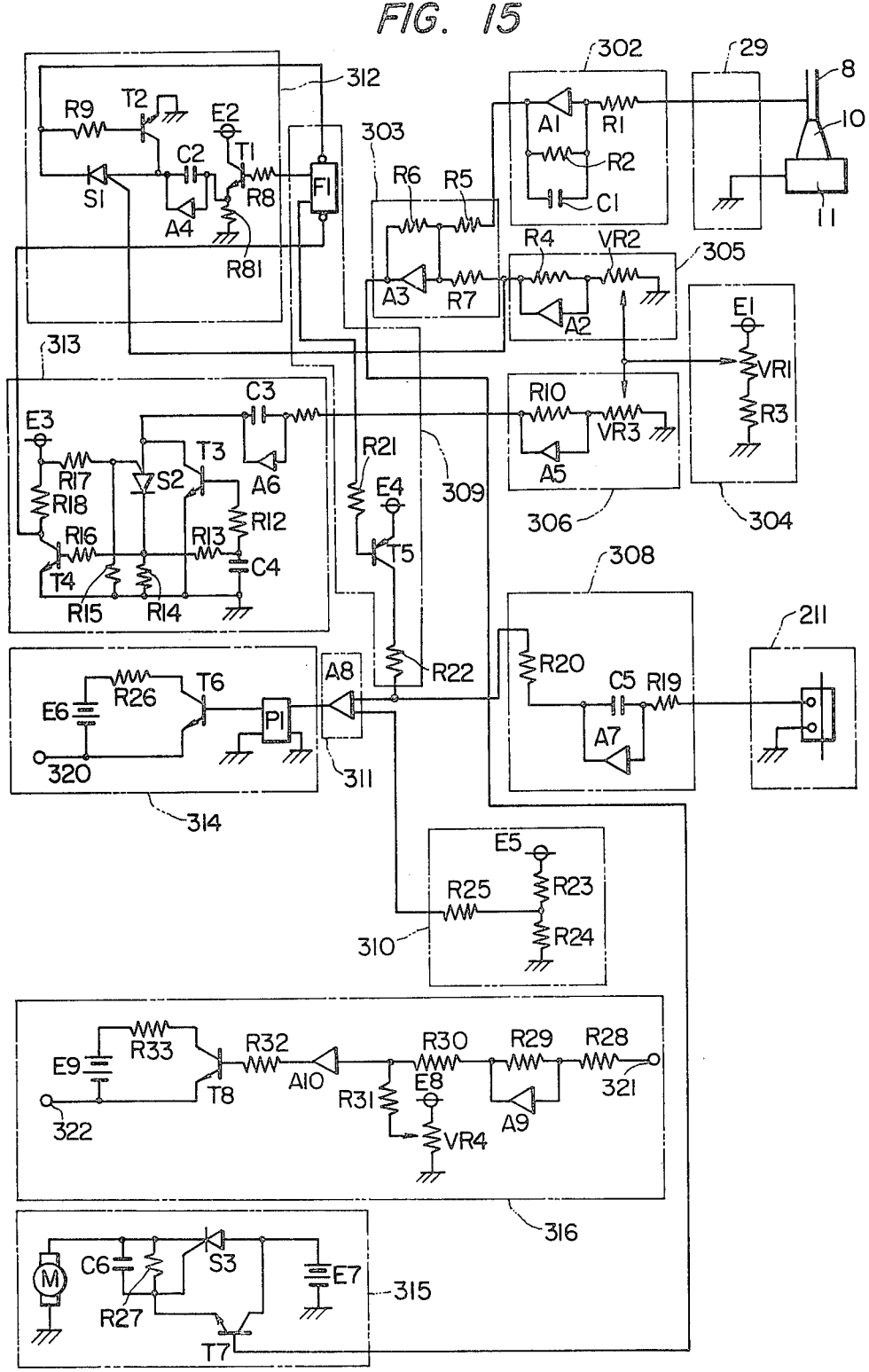
FIG. 15 is a circuit diagram showing a specific circuit arrangement of the control circuit shown in block diagram form in FIG. 14.

In the control circuit shown in FIG. 15, the circuit arrangements of the control circuit are almost the same as those shown in FIG. 7. However, the control circuit shown in FIGS. 14 and 15 differs from that shown in FIGS. 6 and 7 in that the output from the comparator A 303 is applied instead of the output from the wire feeding rate instructing circuit 304 to the wire feeding rate setting circuit 315, and the output from the function generator A 305 is applied to the pulse width setting circuit 312. Accordingly, the control circuit is adapted to increase the wire feeding rate if the length of the arc is increased and vice versa as well as to prevent excessive splattering due to short-circuiting of the wire and the base material. The increase or decrease of the wire feeding rate can be simply performed by varying or stopping the rotation of the wire feeding motor.

It is noted that although the foregoing description with respect to FIGS. 6 through 15 is directed to examples in which a single one of the welding conditions can vary in response to variations in the arc voltage, the same operational effect is achieved if two or more welding conditions are varied simultaneously.

It is also noted that if the length of the arc is varied due to operator-caused fluctuations or due to an irregular base material during a welding operation, the arc voltage is always retained at predetermined value by detecting the variations in the arc voltage in response to the variations in the length of the arc and varying the predetermined welding conditions in accordance with the detection signal. Accordingly, it is noted that instabilities due to variations in the length of the arc due to such fluctuations are completely eliminated to thereby perform satisfactory molten droplet transfer.

It may be appreciated from the foregoing description that since in the control circuit of the pulse arc welding machine of the invention the detected arc voltage is applied to the integrating circuit which produces a smoothed average arc voltage and the welding conditions are varied in accordance with this average arc voltage, control adjustment of the welding conditions can be advantageously accelerated accurately.

Figure 16:
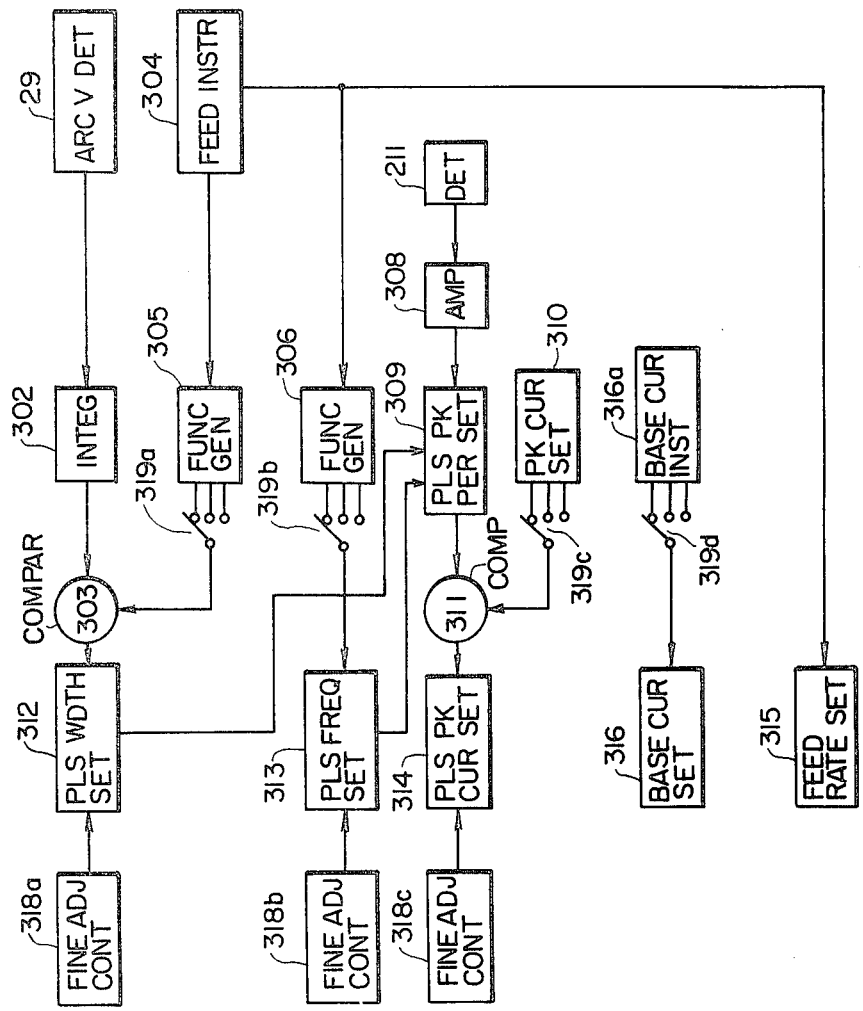
FIG. 16 is a block diagram of still another example of a control circuit.

Still another example of the circuit arrangement in block diagram form of the control circuit 31 or 32 is shown in FIG. 16, as a modification of the control circuit shown in FIG. 6, wherein like reference numerals designate the same parts and components in FIG. 6.

The control circuit shown in FIG. 16 differs from that shown in FIG. 6 in that fine adjustment controllers 318a through 318c capable of finely controlling the set values in the setting circuits 312 through 314 for manual operation are provided in addition to the control circuit arrangement shown in FIG. 6 and switches 319a through 319d capable of automatically or manually switching the function relations of the respective function generators 305 and 306 and the instructing values of the respective instructing circuits 310 and 316a are added. The instructing circuit 316a, which is provided to generate a signal for setting the base current value of the base current setting circuit 316, includes a power source E8 and a variable resistor VR4 in the same manner as those in the setting circuit 316 shown in FIG. 7.

The operation of the control circuit thus constructed in FIG. 16 will be described.

In order to obtain satisfactory welding with the control circuit thus constructed, it is necessary to vary and set in combination the pulse width setting circuit 312, the pulse frequency setting circuit 313, the pulse peak current setting circuit 314 and the wire feeding rate setting circuit 315 and the like.

First, the variable resistor VR1 is controlled to determine the wire feeding rate in the wire feeding rate instructing circuit 304 for setting the wire feeding speed. The set wire feeding rate signal from the instructing circuit 304 is in turn applied to the function generator A 305, which converts the set wire feeding rate signal into a voltage responsive to the wire feeding rate. The voltage from the function generator A 305 is in turn applied to the comparator A 303.

On the other hand, when the wire is fed at the starting time of the pulse arc welding machine of the invention and an arc is generated in the spark gap between the wire electrode and the base material, the arc voltage is detected by the arc voltage detecting circuit 29. The arc voltage thus detected is in turn applied to the integrating circuit 302, and is thus smoothed in the integrating circuit 302. The smoothed arc voltage thus detected is in turn applied to the comparator 303. Thus, the comparator 303 compares the voltage responsive to the wire feeding rate from the function generator A 305 with the smoothed arc voltage thus detected from the integrating circuit 302.

The differential voltage between the voltage responsive to the wire feeding rate form the function generator A 305 and the arc voltage thus detected from the integrating circuit 302 as thus compared is applied sequentially to the pulse width setting circuit 312, which serves to automatically vary the pulse width so that the voltage responsive to the wire feeding rate becomes equal to the detected arc voltage. For instance, if the length of the arc is set long, the pulse width is set short, and vice versa.

Further, the set wire feeding rate signal from the instructing circuit 304 is also applied to the function generator B 306, which serves to define the relations between the wire feeding rate and the pulse frequency and to convert the set wire feeding rate signal into a voltage responsive to the wire feeding rate. The voltage from the function generator B 306 is in turn applied to the pulse frequency setting circuit 313, which serves to set the pulse frequency.

On the other hand, the arc current detected by the arc current detecting circuit 211 is applied to the input of the amplifying circuit 308 which amplifies the detected arc current from the detecting circuit 211. The detected arc current thus amplified is in turn applied to the pulse peak period selecting circuit 309 which separates the detected arc current into an arc current during a base period and a base current as well as an arc current during a peak period and a pulse current.

The arc current during the peak period thus separated out is applied from the selecting circuit 309 to the comparator B 311. The pulse peak current value instruction signal from the peak current value instructing circuit 310 is also applied to the comparator B 311. Thus, the comparator B 311 compares the arc current during the peak period from the selecting circuit 309 with the peak current value instruction signal from the instructing circuit 310 and produce a differential voltage therebetween. The differential voltage thus produced is in turn applied to the pulse peak current setting circuit 314 which in response thereto maintains the pulse peak current always constant. The base current is retained substantially at constant value during a welding operation.

If the diameter of the wire is varied, for example, among 0.9 mm, 1.2 mm and 1.6 mm, if the material of the wire is varied, for example among soft steel, stainless steel and aluminum, or if the shielding gas ingredients are varied, for example, between argon gas and an argon gas-carbon dioxide gas mixture, it is necessary to vary correspondingly the functional relations of the above-described function generators, the peak current values of the respective instructing circuits and the base current value so as to thereby produce an optimum output from the respective circuits. Accordingly, in the control circuit of this embodiment, multicontact switches 319a through 319d are respectively provided in the respective function generators 305 and 306, the peak current instructing circuit 310 and the base current instructing circuit 316a for setting optimum values corresponding to the chosen combinations of the diameter of the wire, the material of the wire and the shielding gas ingredients, the relations between the wire feeding rate and the arc voltage, the relations between the wire feeding rate and the pulse frequency, the peak current value and the base current value and the like.

It is noted that the afore-described switches 319a through 319d may be of a manual operation type, an interlocking type, or an automatic type.

It is also noted that the aforementioned embodiment is directed to a control circuit in which the output of the wire feeding rate instructing circuit 304 is applied to the function generators 305 and 306 which in turn output predetermined functions, but the same operational effect can be achieved using arrangements other than the specific one described. For instance, the output of the wire feeding rate setting circuit 315, the armature voltage of the wire feeding motor or the output of the wire feeding speed detector may be applied to the function generators 305 and 306 so as to achieve the same operational effect.

As is apparent from the above description, the fine adjustment controllers are provided in the setting circuits 312 through 314 so that, even if the same diameter and material of the wire are employed, but there are small variations in the composition of the wire, the arc characteristics can be completely corrected.

Furthermore, according to the control circuit of this embodiment, the functional relations can be switched by setting the switches provided in the function generators and the instructing circuits. Accordingly, even if the diameter of the wire is varied, the material of the wire is varied, or the shielding gas ingredients are varied, the functional relations can be correspondingly varied in the above-described function generators, and the peak current values of the respective instructing circuits and the base current values can be readily varied without any difficult readjustments.

Figure 17:
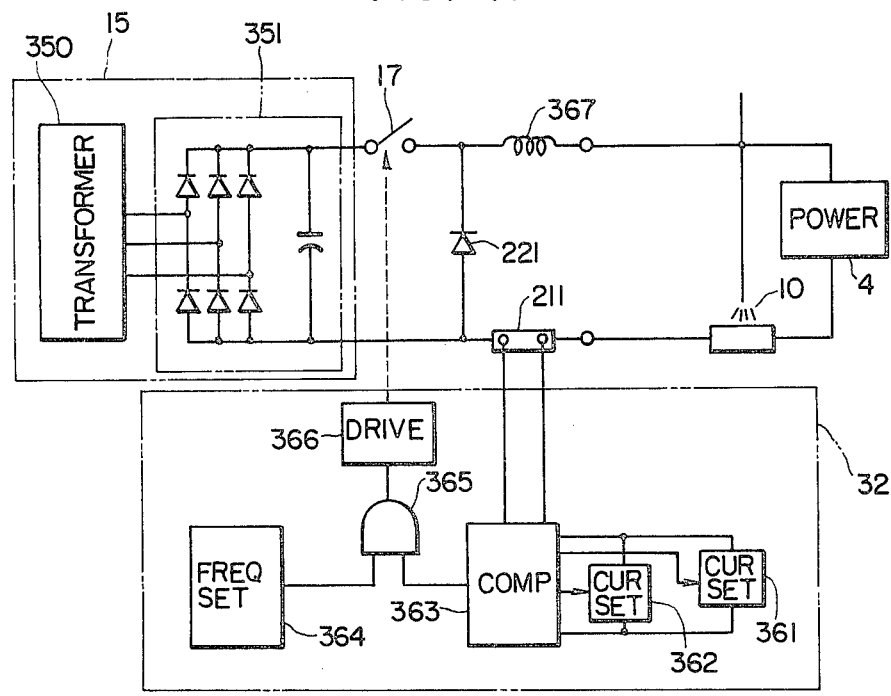
FIG. 17 is a schematic diagram of the circuit arrangement of a power source.
Figure 17:
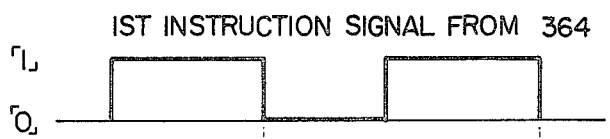
Figure 17:
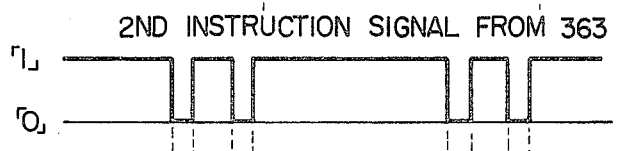
Figure 17:
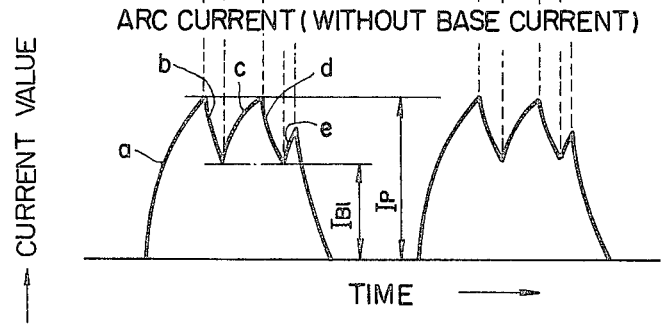

Still another example of the control circuit 32 for the switching circuit 17 in FIG. 4 will be described with reference to FIG. 17 which shows an example of a power source circuit arrangement wherein like reference numeral designate the same parts and components as in FIG. 4. In FIG. 17, the power source circuit includes a DC power source 15 which has a transformer 350 and a DC generator or a rectifier 351; and a control circuit 32 which has an upper limiting current setting unit 361, a lower limiting current setting unit 362, a comparator 363, a pulse frequency setting unit 364, an AND gate 365, and a drive circuit 366 for a switching element 17. The power source circuit also includes a power source 4, a welding or arc current detector 211 and a freewheel diode 221.

The operation of the power source circuit thus constructed will be described with reference to FIG. 17.

An output pulse current is produced by the pulse frequency setting unit 364 as a first instruction signal, as shown in FIG. 18A, wherein the signal at high level "1" represents a closing instruction period for the switching element 17. The frequency of the first instruction signal is set for a welding operation by the control circuit shown in FIG. 17 irrespective of the frequency of the power source. The pulse frequency signal thus produced is applied to one input of the AND gate 365.

Detected arc current flowing in a circuit composed of the power source 15, the arc current detector 211, the welding arc section 10 and the switching element 17 is applied from the detector 211 to the comparator 363.

Further, upper and lower limiting current value signals are also applied from respective upper and lower limiting current setting units 361 and 362 to the comparator 363. The comparator 363 thus compares the detected arc current in the welding circuit with the upper and lower limiting current value signals and produces a second instruction signal for closure for the switching element 17, as shown in FIG. 18B, wherein the signal at a high level "1" represents the closing period of the switching element 17. Thus the switching element 17 in the welding circuit is closed when the detected arc current from the detector 211 is lower than the set upper limiting current value from the upper limiting current setting unit 361. The compared output thus produced is applied from the comparator 363 to the other input of the AND gate 365.

The AND gate 365 is enabled to produce a closure output signal to the drive circuit 366 when both the first and second instruction signals from the pulse frequency setting unit 364 and the comparator 363 at the high level "1" are applied to the AND gate 365. When the closure output signal is thus applied from the comparator 363 to the drive circuit 366, the drive circuit 366 produces a closure drive signal thereby closing the switching element 17.

When the switching element 17 is thus closed, a current flows, which increases with a predetermined time constant, as indicated by a portion of the waveform of the current shown in FIG. 18C, in a circuit composed of the DC generator or rectifier 351, the switching element 17, the arc section 10 and the current detector 211. The detected arc current is thus applied to the comparator 363. When the detected arc current in the welding circuit reaches the set upper limiting current value $I_p$ of the upper limiting current setting unit 361, the comparator 363 produces the second instruction signal of a low level "0" as indicated in FIG. 18B, i.e. the opening instruction signal for the switching element 17. The opening instruction signal thus produced is in turn applied to the other input of the AND gate 365. Since the opening instruction signal thus produced is at a low level "0" at the input of the AND gate 365, the AND gate 365 will produce an output signal of a low level for the drive circuit 366. Consequently, the drive circuit 366 thus produces an opening drive signal to the switching element 17 thereby opening the switching element 17 in the welding circuit.

Thereafter, a dynamic current due to the inherent inductance of the welding circuit flows in a circuit composed of the arc section 10, the pulse current detector 211 and the freewheel diode 211. The dynamic current in the welding circuit decreases gradually as indicated by portion b of the waveform of the current is shown in FIG. 18C. The current welding circuit thus decreased is detected by the detector 211 and the detector output current is applied to the comparator 363. When the detected current in the welding circuit reaches a value lower than the set lower limiting current value $I_{B1}$ from the lower limiting current setting unit 362, as indicated by a portion b the waveform shown in FIG. 18C, the comparator 363 produces again the second instruction signal at the high level "1" as indicated in FIG. 18B, i.e. the closure instruction signal for the switching element 17. The closure instruction signal thus produced is applied to the other input of the AND gate 365 in the same manner for the initial welding current in the welding circuit as described above. On the other hand, the first instruction signal at the high level "1" is applied from the pulse frequency setting unit 364 as indicated in FIG. 18A to the AND gate 365. The AND gate 365 is thus again enabled to produce a closure instruction signal of a high level "1" to the drive circuit 366. With the closure instruction signal at the high level "1" thus applied to the drive circuit 366, the drive circuit 366 will produce a closure drive signal to the switching element 17, thereby closing the switching element 17 in the same manner as for the initial welding current in the welding circuit as indicated by a portion c of the waveform shown in FIG. 18C so that the arc current increases in the welding circuit composed of the DC generator 351, the switching element 17, the arc section 10 and the pulse current detector 211. Successively, similar operations are repeated in the welding circuit until the pulse current setting unit 364 returns the first instruction signal at the high level "1" to the low level "0" as indicated in FIG. 18A thereby opening the switching element 17. Thus, the peak value of the output pulse current in the welding circuit is thus retained between the upper limiting current value $I_p$ and the lower limiting current value $I_{B1}$ as a predetermined constant value as indicated by portions d and e of the waveform shown in FIG. 18C.

As is apparent from the above description with respect to the power source circuit of the embodiment indicated in FIG. 17, the output pulse frequency from the pulse frequency setting unit in the control circuit can be selected irrespective of the frequency of the power source for the pulse arc welding maching. In addition, the peak value of the output pulse current from the control circuit is maintained at a predetermined value between the upper limiting current value $I_p$ and the lower limiting current value $I_{B1}$ irrespective of the arc load in the welding circuit.

In the control circuit of the example shown in FIG. 17, the lower limiting current setting unit 362 is advantageously provided in addition to the upper limiting current setting unit 361 to maintain the peak value of the pulse current at a predetermined constant value so that heat loss occurring at the time of switching the switching element 17 ON or OFF is reduced for purposes of safety.

If the detected arc current of the detector 211 in the welding circuit were compared only with the upper limiting current value set by the upper limiting current setting unit 361, the switching frequency of the switching element 17 would have to be very high in order to maintain the upper limiting current value of the arc current at an acceptable level. Accordingly, it would thus be necessary to provide a switching element which had a large thermal capacity so as to prevent heat damage to the switching element due to the high switching frequency. Such a disadvantage can be avoided by providing a hysteresis characteristic in the comparator 363 with both the upper and lower limiting current setting units 361 and 362.

It has been determined experimentally that it is desirable to set the difference of the set upper and lower limiting currents between the upper limiting current setting unit 361 and the lower limiting current setting unit 362 to less than 150 A. If the difference exceeds 150 A, the arc and accordingly the molten droplet transfer become unstable and an arcing noise is disadvantageously generated.

Further, there may also be provided a DC reactor 367 which is connected in series with the switching element 17 in a closed circuit composed of the diode 221 and the arc section 10 so as to prevent abrupt increase or decrease of the arc current flowing in the circuit. When the DC reactor 367 is inserted in this manner in the welding circuit, the current is slowly attenuated while the switching element 17 is opened by the drive circuit 366. Thus, the switching frequency of the pulse current detected by the pulse current detector 211 is reduced and the heat loss of the switching element 17 and the arc noise produced upon variation of the pulse current due to the switching of the switching element 17 are advantageously reduced. It has been found experimentally that the value of the DC reactor 367 thus inserted in the welding circuit is suitably approximately 10 to 300 $\mu$H. If the inductance of the DC reactor were exceedingly out of this range, the advantageous effect of the DC reactor would be reduced.

It may be appreciated from the foregoing description that since in the control circuit of the power source circuit of the invention an arbitrary optimum output pulse frequency for welding operations can be selected by the first instruction signal from the setting unit irrespective of the frequency of the power source so as to produce an output pulse current using the switching element, and further that the peak value of the pulse current can be maintained at a predetermined value or in a predetermined range regardless of the arc load state utilizing the second instruction signal from the comparator for comparing the detected arc current with the upper and lower limiting currents set by the upper and lower limiting current setting units, respectively, the control circuit of the invention will not be affected by disturbances such as system transients but will maintain a stable arc state in the welding circuit and can accordingly advantageously improve the quality of welding and furthermore reduce the required capacity of the switching element employed in the circuit.

What is claimed is:

1. A pulse arc welding machine comprising:
    a wire feeding unit for feeding a wire electrode to a base material to be welded;
    a base current source for supplying a base current between said wire electrode and said base material;
    base current setting means for controlling said base current source;
    a pulse current source for supplying a pulse current superposed on said base current flowing between said wire electrode and said base material;
    means for detecting an arc voltage of an arc discharge between said wire electrode and said base material;
    integrating means for integrating an output of said arc voltage detecting means;
    wire feeding speed instructing means for providing a first control signal representative of a desired wire feeding speed;
    wire feeding speed setting means for controlling said wire feeding unit in response to said first control signal;
    first function generating means for producing, in response to said first control signal, a second control signal representative of said arc voltage as a function of said first control signal;
    first comparing means for comparing an output of said integrating means with said second control signal;
    pulse width setting means for producing a third control signal representative of a pulse width in response to an output of said first comparing means;

second function generating means for producing, in response to said first control signal, a fourth control signal representative of a pulse frequency as a function of said first control signal;

pulse frequency setting means for producing, in response to said fourth control signal, a fifth control signal indicative of a pulse frequency, said fifth control signal being applied to said pulse current source for controlling a frequency of said pulse current;

means for detecting a sum of said base current and said pulse current and providing a signal representative of said sum;

amplifying means for amplifying said signal representative of said sum of said base current and said pulse current;

pulse peak current selecting means for producing a sixth control signal representative of a current during a pulse peak period in response to said third and fifth control signals and an output of said amplifying means;

second comparing means for comparing a fixed reference value with said sixth control signal; and pulse peak current setting means for controlling said pulse current source for setting a pulse peak current of said pulse current in response to an output of said second comparing means.

2. A pulse arc welding machine comprising:
a wire feeding unit for feeding a wire electrode to a base material to be welded;
a base current source for supplying a base current between said wire electrode and said base material;
base current setting means for controlling said base current source;
a pulse current source for supplying a pulse current superposed on said base current flowing between said wire electrode and said base material;
means for detecting an arc voltage of an arc discharge between said wire electrode and said base material;
integrating means for integrating an output of said arc voltage detecting means;
wire feeding speed instructing means for providing a first control signal representative of a desired wire feeding speed;
wire feeding speed setting means for controlling said wire feeding unit in response to said first control signal;
first function generating means for producing, in response to said first control signal, a second control signal representative of said arc voltage as a function of said first control signal;
first comparing means for comparing an output of said integrating means with said second control signal;
pulse frequency setting means for producing, in response to an output of said first comparing means, a third control signal indicative of a pulse frequency;
pulse width setting means for producing a fourth control signal representative of a pulse width in response to said second control signal;
means for detecting a sum of said base current and said pulse current and providing a signal representative of said sum;
amplifying means for amplifying said signal representing said sum of said base current and said pulse current;
pulse peak current selecting means for producing a fifth control signal repesentative of a current during a pulse peak period in response to said third and fourth control signals and an output of said amplifying means;
second comparing means for comparing a fixed reference value with said fifth control signal; and
pulse peak current setting means for controlling said pulse current source for setting a pulse peak current of said pulse current in response to an output of said second comparing means.

3. A pulse arc welding machine comprising:
a wire feeding unit for feeding a wire electrode to a base material to be welded;
a base current source for supplying a base current between said wire electrode and said base material;
base current setting means for controlling said base current source;
a pulse current source for supplying a pulse current superposed on said base current flowing between said wire electrode and said base material;
means for detecting an arc voltage of an arc discharge between said wire electrode and said base material;
integrating means for integrating an output of said arc voltage detecting means;
wire feeding speed instructing means for providing a first control signal representative of a desired wire feeding speed;
wire feeding speed setting means for controlling said wire feeding unit in response to said first control signal;
first function generating means for producing, in response to said first control signal, a second control signal representative of said arc voltage as a function of said first control signal;
first comparing means for comparing an output of said first integrating means with said second control signal to produce a third control signal;
pulse width setting means for producing a fourth control signal representative of a pulse width in response to said second control signal;
second function generating means for producing, in response to said first control signal, a fifth control signal representative of a pulse frequency as a function of said first control signal;
pulse frequency setting means for producing, in response to said fifth control signal, a sixth control signal indicative of a pulse frequency, said sixth control signal being applied to said pulse current source for controlling a frequency of said pulse current;
means for detecting a sum of said base current and said pulse current and providing a signal representative of said sum;
amplifying means for amplifying said signal representative of said sum of said base current and said pulse current;
pulse peak current selecting means for producing a seventh control signal representative of a current during a pulse peak period in response to said fourth and sixth control signals and an output of said amplifying means;
second comparing means for comparing said third and seventh control signals;
pulse peak current setting means for controlling said pulse current source for setting a pulse peak current of said pulse current in response to an output of said second comparing means.

4. A pulse arc welding machine comprising:
a wire feeding unit for feeding a wire electrode to a base material to be welded;
a base current source for supplying a base current between said wire electrode an said base material;
base current setting means for controlling said base current source;
a pulse current source for supplying a pulse current superposed on said base current flowing between wire electrode and said base material;
means for detecting an arc voltage of an arc discharge between said wire electrode and said base material;
integrating means for integrating an output of said arc voltage detecting means;
wire feeding speed instructing means for providing a first control signal representative of a desired wire feeding speed;
wire feeding speed setting means for controlling said wire feeding unit in response to said first control signal;
first function generating means for producing, in response to said first control signal, a second control signal representative of said arc voltage as a function of said first control signal;
first comparing means for comparing an output of said integrating means with said second control signal to produce a third control signal;
base current setting means for controlling said base current source for setting a magnitude of said base current in response to said third control signal;
pulse width setting means for producing a fourth control signal representative of a pulse width in response to said third control signal;
second function generating means for producing, in response to said first control signal, a fifth control signal representative of a pulse frequency as a function of said first control signal;
pulse frequency setting means for producing, in response to said fifth control signal, a sixth control signal indicative of a pulse frequency, said sixth control signal being applied to said pulse current source for controlling a frequency of said pulse current;
means for detecting a sum of said base current and said pulse current and providing a signal representative of said sum;
amplifying means for amplifying said signal representative of said sum of said base current in said pulse current;
pulse peak current selecting means for producing a seventh control signal representative of a current during a pulse peak period in response to said fourth and sixth control signals and an output of said amplifying means;
second comparing means for comparing a fixed reference value with said seventh control signal; and
pulse peak current setting means for controlling said pulse current source for setting a pulse peak current of said pulse current in response to an output of said second comparing means.

5. A pulse arc welding machine comprising:
a wire feeding unit for feeding a wire electrode to a base material to be welded;
a base current source for supplying a base current between said wire electrode and said base material;
base current setting means for controlling said base current source;
a pulse current source for supplying a pulse current superposed on said base current flowing between said wire electrode and said base material;
means for detecting an arc voltage of an arc discharge between said wire electrode and said base material;
integrating means for integrating an output of said arc voltage detecting means;
wire feeding speed instructing means for providing a first control signal representative of a desired wire feeding speed;
wire feeding speed setting means for controlling said wire feeding unit in response to said first control signal;
first function generating means for producing, in response to said first control signal, a second control signal representative of said arc voltage as a function of said first control signal;
first comparing means for comparing an output of said integrating means with said second control signal;
pulse width setting means for producing a third control signal repesentative of a pulse width in response to an output of said first comparing means;
second function generating means for producing, in response to said first control signal, a fourth control signal representative of a pulse frequency as a function of said first control signals;
pulse frequency setting means for producing, in response to said fourth control signal, a fifth control signal indicative of a pulse frequency, said fifth control signal being applied to said pulse current source for controlling a frequency of said pulse current;
means for detecting a sum of said base current and said pulse current and providing a signal representative of said sum;
amplifying means for amplifying said signal representative of said sum of said base current and said pulse current;
pulse peak current selecting means for producing a sixth control signal representative of a current during a pulse peak period in response to said third and fifth control signals and an output of said amplifying means;
second comparing means for comparing a fixed reference value with said sixth control signal; and
pulse peak current setting means for controlling said pulse current source for setting a pulse peak value of said pulse current in response to an output of said second comparing means.

* * * * *